United States Patent [19]

Gomes et al.

[11] Patent Number: 4,517,650

[45] Date of Patent: May 14, 1985

[54] FEEDER INTERFACE CIRCUIT FOR UNIVERSAL MULTI-STATION DOCUMENT INSERTER

[75] Inventors: John M. Gomes, Bridgeport; Peter N. Piotroski, New Canaan, both of Conn.

[73] Assignee: Pitney Bowes Inc., Stamford, Conn.

[21] Appl. No.: 394,383

[22] Filed: Jul. 1, 1982

[51] Int. Cl.[3] .......................... G06F 15/20; G06G 7/48

[52] U.S. Cl. .......................... 364/478; 364/138; 364/146; 364/471; 364/900; 270/58; 271/3.1; 271/4; 271/259; 53/500; 53/540

[58] Field of Search ............... 364/471, 478, 138, 146, 364/188, 200, 900; 270/53, 54, 55, 56, 57, 58; 271/258, 259, 3.1, 4; 53/495, 500, 540

[56] References Cited

U.S. PATENT DOCUMENTS

| | | | |
|---|---|---|---|
| 3,559,188 | 1/1971 | Proctor | 364/200 |
| 3,606,728 | 9/1971 | Sather et al. | 270/58 |
| 3,899,165 | 8/1975 | Abram et al. | 270/54 |
| 4,121,818 | 10/1978 | Riley et al. | 364/478 |
| 4,351,025 | 9/1982 | Hall, Jr. | 364/200 |
| 4,365,297 | 12/1982 | Grisham, Jr. | 364/200 |
| 4,395,031 | 7/1983 | Gruber et al. | 270/54 |

*Primary Examiner*—Jerry Smith
*Assistant Examiner*—John R. Lastova
*Attorney, Agent, or Firm*—Michael J. DeSha; Martin D. Wittstein; William D. Soltow, Jr.

[57] ABSTRACT

A method and associate apparatus for providing a universal feeder interface circuit for a multi-station document inserter having a plurality of document feeder stations or modules and a central processor which stores a supervisory program is provided. Each interface circuit has a unique address and a distributed processor which stores feeder programs containing instructions for operating a variety of different types of feeders. The interface circuit, in response to address and command signals received from the central processor provides operating instructions from the programs stored in the distributed processor to its feeder station to operate the feeders in a manner pre-selected by the user.

9 Claims, 41 Drawing Figures

Microfiche Appendix Included
(4 Microfiche, 209 Pages)

TO FIG. 5B.

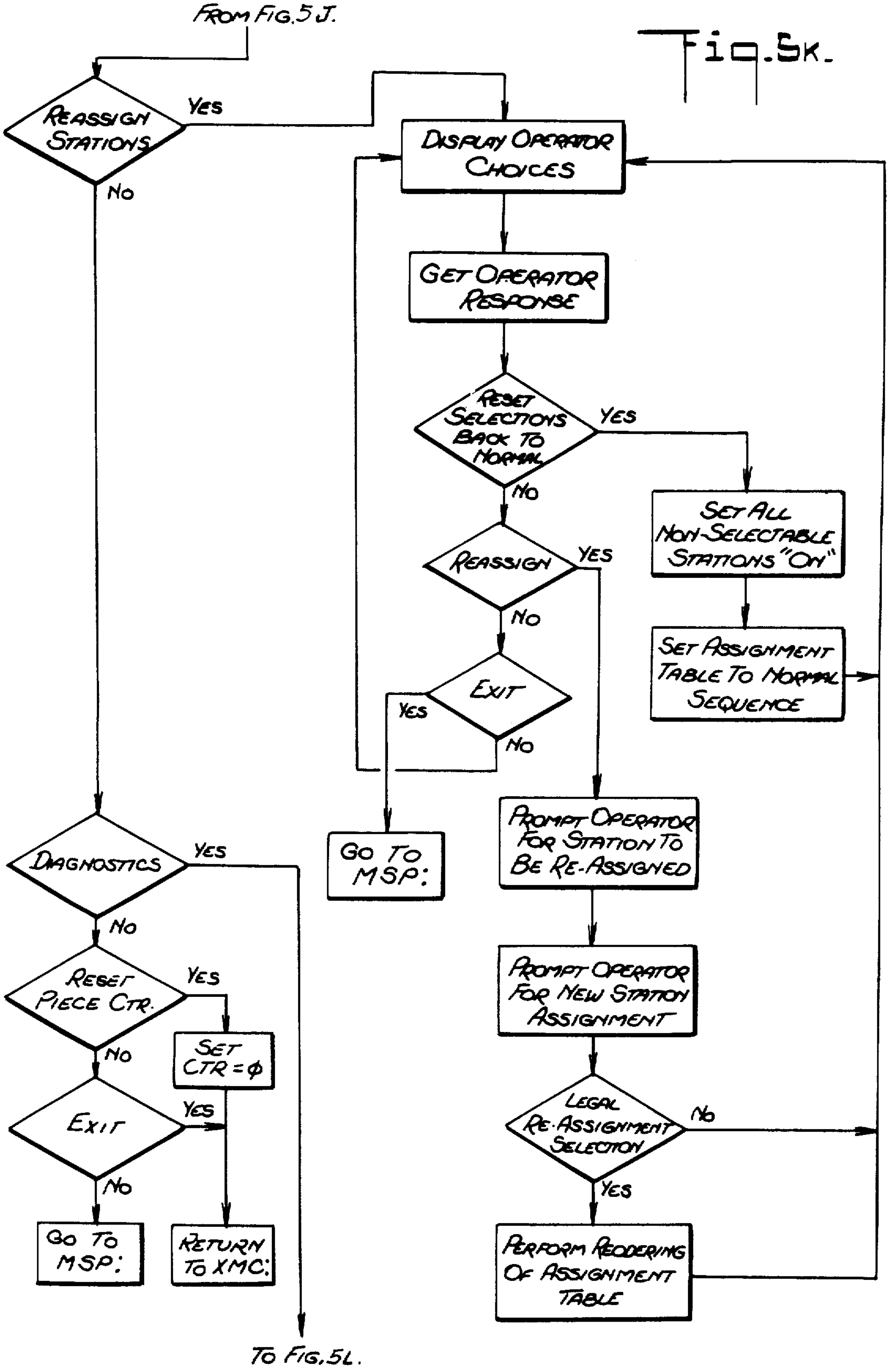
FROM FIG. 5 J.
Fig. 5K.
REASSIGN STATIONS
YES
NO
DISPLAY OPERATOR CHOICES
GET OPERATOR RESPONSE
RESET SELECTIONS BACK TO NORMAL
YES
NO
SET ALL NON-SELECTABLE STATIONS "ON"
SET ASSIGNMENT TABLE TO NORMAL SEQUENCE
REASSIGN
YES
NO
EXIT
YES
NO
GO TO MSP:
PROMPT OPERATOR FOR STATION TO BE RE-ASSIGNED
PROMPT OPERATOR FOR NEW STATION ASSIGNMENT
LEGAL RE-ASSIGNMENT SELECTION
NO
YES
PERFORM REODERING OF ASSIGNMENT TABLE
DIAGNOSTICS
YES
NO
RESET PIECE CTR.
YES
NO
SET CTR = φ
EXIT
YES
NO
GO TO MSP:
RETURN TO XMC:
TO FIG. 5L.

FROM FIG. 5K.

TO FIG. 5M.

FEEDER INTERFACE CIRCUIT FOR UNIVERSAL MULTI-STATION DOCUMENT INSERTER

MICROFICHE APPENDIX

The supervisory program for the central processor is set forth in the accompanying microfiche appendix including 3 microfiche having a total of 173 frames.

The programs for a high ratio feeder, a high speed feeder, an envelope feeder and a burster-folder are set forth in the accompanying microfiche appendix including 1 microfiche having a total of 36 frames.

RELATED APPLICATIONS

This application is related to U.S. application Ser. No. 394,388 entitled "UNIVERSAL MULTI-STATION DOCUMENT INSERTER" filed on July 1, 1982 in the names of Peter N. Piotroski and John M. Gomes; U.S. application Ser. No. 394,385 filed on July 1, 1982 in the names of Peter N. Piotroski and John M. Gomes and entitled "METHOD AND APPARATUS FOR CUSTOMIZING A MULTI-STATION DOCUMENT INSERTER"; U.S. application Ser. No. 394,389 filed on July 1, 1982 in the name of Peter N. Piotroski and entitled "MULTI-STATION DOCUMENT INSERTER WITH AUTOMATIC START UP AND SHUT DOWN DOCUMENT COLLATION SEQUENCES"; U.S. application Ser. No. 394,386 filed on July 1, 1982 in the names of Peter N. Piotroski and John M. Gomes and entitled "USER FRIENDLY CENTRAL CONTROL DISPLAY FOR A MULTI-STATION DOCUMENT INSERTER"; U.S. application Ser. No. 394,384 filed on July 1, 1982 in the names of Peter N. Piotroski and John M. Gomes and entitled "DIAGNOSTIC MODE FOR A MULTI-STATION DOCUMENT INSERTER"; U.S. application Ser. No. 394,390 filed on July 1, 1982 in the names of Peter M. Piotroski and Robert K. Gottlieb and entitled "SCANNER INTERFACE CIRCUIT FOR UNIVERSAL MULTI-STATION DOCUMENT INSERTER"; and U.S. application Ser. No. 394,387 filed on July 1, 1982 in the names of Peter M. Piotroski and John M. Gomes and entitled "TRANSPORT INTERFACE CIRCUIT FOR UNIVERSAL MULTI-STATION DOCUMENT INSERTER", each of which copending applications is assigned to the assignee of the present invention. The specific and entire disclosure of the aforementioned application is specifically incorporated herein by reference for the purpose of further explaining the nature of operation of the present invention.

BACKGROUND OF THE INVENTION

The present invention relates to document inserters of the multi-station type and more particularly to feeder interface circuits therefor.

Known multi-station document inserters and the feeder circuits employed therein are generally designed and manufactured for a specific customer application. Such machines generally require a substantial period of time to design and manufacture including the individual wiring of circuits such as feeder circuits employed therein. This adds substantially to the cost of such machines and limits their utility to the specific customer application and configuration for which they were designed. One such document inserter is disclosed in the U.S. Pat. No. 3,606,728 issued Sept. 21, 1971 to Sather et al, and assigned to Bell & Howell Co., Phillpsburg, N.J.

SUMMARY OF THE INVENTION

It is an object of the present invention to provide a feeder interface circuit for a universal multi-station document inserter.

It is further object of the present invention to provide a universal feeder interface circuit for a multi-station document inserter, which is capable of operating a variety of different types of feeder modules or stations including for example, high ratio document feeders, high speed document feeders, standard document feeders, burster-folders, folder-feeders, divider page extractors, envelope feeders and the like, without the need for rewiring or reprogramming the device.

It is a still further object of the present invention to provide a universal feeder interface circuit which permits modularly expanding the multi-station document inserter without having to rewire or reprogram the device.

It is a still further object of the present invention to provide a universal feeder interface circuit for a multi-station document inserter whose configuration and functions can be changed without the need for rewiring or reprogramming the device.

Briefly, in accordance with the present invention, a method and associated apparatus is disclosed for providing a universal feeder interface circuit for a multi-station document inserter having a plurality of document feeder stations or modules and a central processor which stores a supervisory program and information on the type of feeder stations and the functions to be performed thereby. Each interface circuit has a unique address and a distributed processor which stores the feeder programs containing instructions for operating a variety of different feeders. The interface circuit, in response to address and command signals received from the central processor provides operating instructions from the program stored in its distributed processor to its feeder station to feed documents in a manner preselected by the user.

Other objects and advantages of the present invention will become apparent upon reading the following detailed description considered in conjunction with the preferred embodiment of the invention illustrated in the drawings as follows:

DESCRIPTION OF THE INVENTION

While the present invention will be described in connection with a preferred embodiment thereof, it will be understood that it is not intended to limit the invention to that embodiment only. On the contrary, it is intended to cover all alternatives, modifications and equivalents as may be reasonably included within the spirit and scope of the invention as defined by the appended claims.

Figure 1:
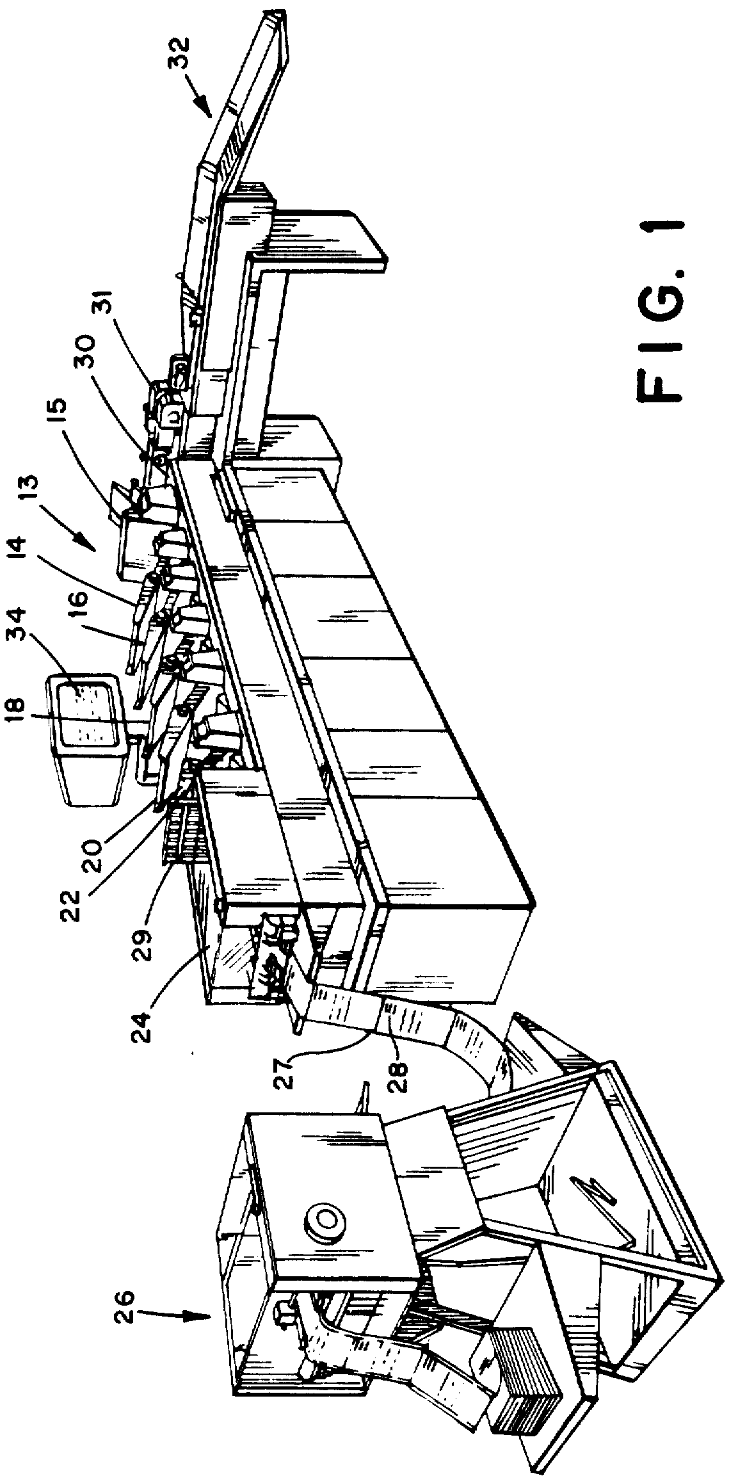
FIG. 1 is a prospective view of a multi-station document inserter employed with the present invention.

Referring to FIG. 1, a document inserter in accordance with the present invention is generally illustrated at 13. The document inserter 13 includes a plurality of serially arranged modules including an envelope feeder station or module 15 and six document feeder stations or modules, including five feeder modules designated 14, 16, 18, 20, 22, and burster-folder station or module 24. A computer generated forms 26 feeds continuous form control documents 27 having coded marks 28 thereon to the burster-folder 24 for separating and folding. The coded marks 28 on the control documents 27 are sensed by a control scanner 29. Thereafter the serially arranged feeder stations 22, 20, 18, 16 and 14 sequentially feed the necessary documents onto the transport deck 30 at each station as the control document 27 arrives at the respective station to form a precisely collated stack of documents which is to be transferred to the envelope feeder 15.

The collated stack of documents is inserted in an envelope at the envelope station 15. The necessary postage is provided and the envelope is sealed by a meter 31. As desired, the completed envelopes may then be transported to a single or multi-station level stacker 32. Further details regarding the inserter may be obtained from the above-noted patent application entitled "UNIVERSAL MULTI-STATION DOCUMENT INSERTER".

The inserter 13 also includes a central control display 34 which displays status messages and fault signals in human readable form and further enables the operator to control and change the configuration of the inserter 13 by way of finger touch switches as is described in further detail in the above-noted application entitled "USER FRIENDLY CENTRAL CONTROL DISPLAY FOR A MULTI-STATION DOCUMENT INSERTER".

Figures 2, 2A:
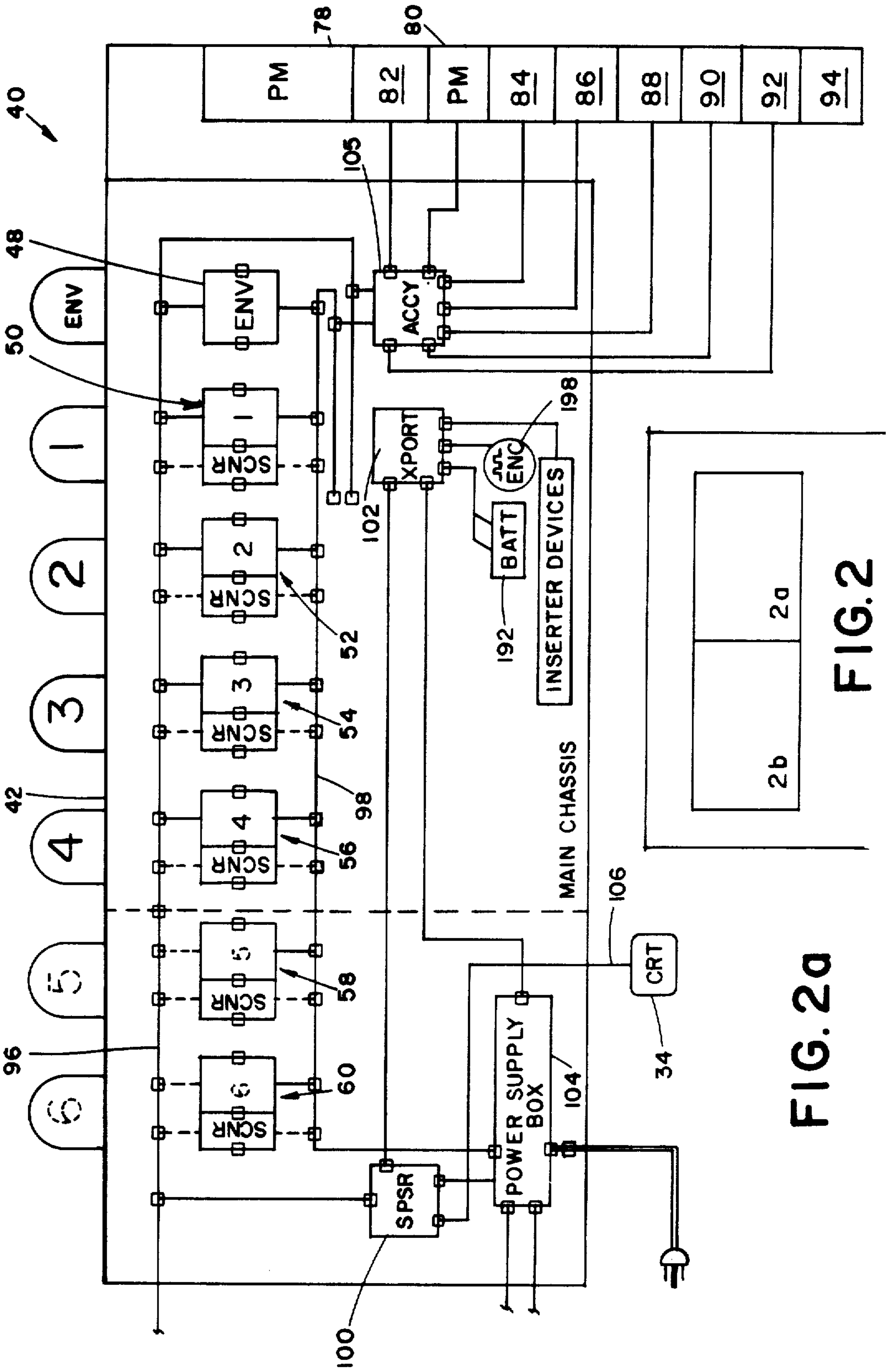
FIG. 2*a*–2*b* are schematic diagrams of the layout of the feeder modules and circuits employed in the multi-station document inserter.
Figure 2B:
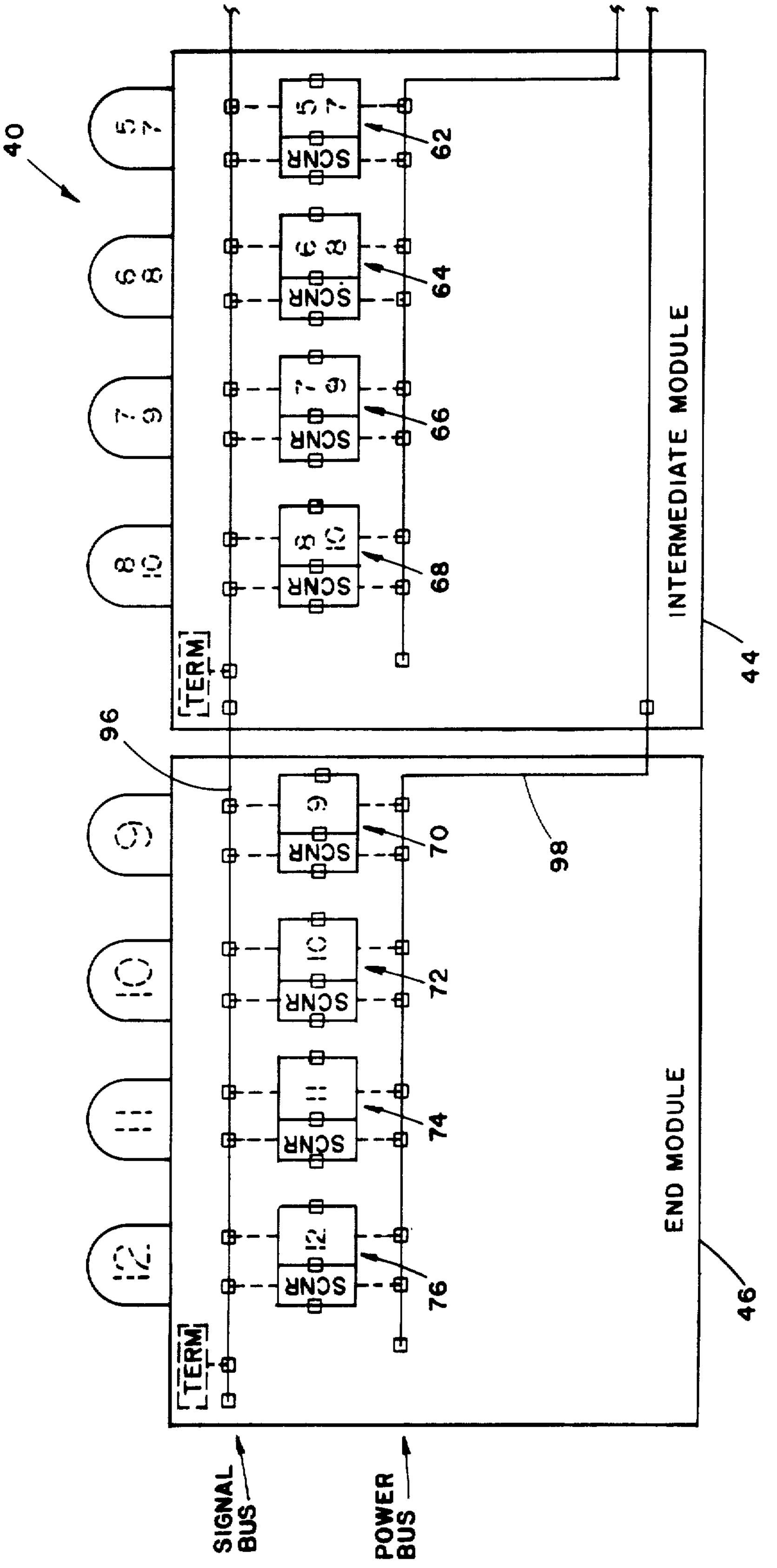

Referring to FIG. 2, the layout of the feeder module and circuits of the document inserter 13 is illustrated. This document inserter is designated 40. It is similar to the document inserter shown in FIG. 1, but shows the modular arrangement of feeder modules having a varying number of feeder modules between four and twelve as desired. A main chassis 42 includes four of six document feeder stations, excluding the envelope feeder 48. An intermediate modular 44 includes four document feeder stations and an end modular 46 also includes four feeder stations.

The electronic circuits of the multi-station document inserter 40 are arranged such that the intermediate module 44 may be readily electrically coupled to the main chassis 42 which includes four or six feeder stations as desired. The end module 46 may also be readily electrically coupled to the intermediate modular 44 as desired. Thus it is apparent from FIG. 2 that the inserter 40 may include 4, 6, 8, 10 or 12 document feeder stations excluding the envelope feeder station 48 in accordance with customary requirements. The feeder stations 1 to 12 are designated 50 through 76 beginning with the feeder station 50 closest to the envelope feeder 48 ending with the most remote feeder station 76 which is the control document document feeder station.

All of the document feeder stations 50, 52, 54, 56, 58, 60, 62, 64, 66, 68, 70, 74 and 76 are arranged in line to serially feed documents therefrom to form collated stacks with the coded documents 27 (see FIG. 1) for insertion into envelopes at envelope station 48. After being placed in an envelope and transported to an accessory station, the envelope is imprinted with the proper postage and sealed by a postage meter 78. A second postage meter 80 may be provided and used for a Postage Break if the documents and the envelope exceed a predetermined number indicating additional postage is necessary. Additional accessories such as multi-level power stackers for rejection of incomplete collations and for sorting various completed collations may be provided by levels 82, 84, 86, 88, 90, 92 and 94.

The feeder stations 48 through 76 are arranged in parallel between a single bus 96 and a power bus 98 so that each of the feeder stations 48 through 76 has a unique address code in the signal bus 96. Further, the feeder station 76 most remote from the envelope feeder station 48, which is normally, but not necessarily a burster-folder, includes a control scanner interface circuit which will be described in more detail hereinafter. Advantageously, any scanning multi-document feeder may be used in this position to feed a control document. The other feeder stations will also typically include a scanner interface circuit to provide additional control. Further, each feeder module 48 through 76 will include a feeder interface circuit which will be described in more detail hereinafter. Advantageously, the scanner and interface circuits for each feeder modular are physically the same. This is highly advantageous in providing a universal multi-station document inserter with intelligence present at each feeder/scanner module capable of carrying out certain feeding/scanning operations in response to a central control command.

Further, as seen in FIG. 2, a supervisory control circuit 100 is electrically coupled to the signal bus 96 and to a transport interface circuit 102. A power supply 104 is coupled to the power bus 98, the supervisory control circuit 100 and to the transport interface circuit 102. The feeder interface circuit and to the transport interface circuit 102. The feeder interface circuit and scanner interface circuits in the feeder modules 50 through 76 are arranged in parallel between the signal bus 96 and the power bus 98. Also coupled to the signal bus 96 and power bus 98 is an accessory interface circuit 105. In response to signals from the supervisory control circuit 100, the accessory interface circuit 105 provides output signals to various accessories such as postage meters 78 and 80 and the multi-level power stackers 82 and 84 through 94. Coupled to the supervisory control circuit 100 is the central control display 34 (see FIG. 1).

The supervisory control circuit for central microprocessor 100 includes a single board computer and an auxilliary memory board. The single board microcomputer and auxilliary memory board also include plug-in sockets for receiving programmable read only memory (PROMS). A supervisory program capable of running all of the devices of the inserter and performing all desired control functions is stored in the plug-in PROMS which are plugged into the single board microcomputer and the auxilliary memory board. The program listing for the supervisory program is set forth in the accompanying Microfiche Appendix. An additional PROM (a configuration PROM) includes a data table which specifies a particular inserter configuration and the functions to be performed for that configuration by the executable routines in the supervisory programs. The details of generating a configuration PROM for use in the universal multi-station document inserter of the present invention are found in the above-mentioned application entitled "METHOD AND APPARATUS FOR CUSTOMIZING A MULTI-STATION DOCUMENT INSERTER".

By using the foregoing format for the supervisory control circuit for central microprocessor 100, there is no need to change any of the executable programs. Thus the same supervisory program may be incorporated into the supervisory control circuit 100 of each multi-station document inserter. The configuration PROM contains no executable programs but only a table of data which specifies a particular routine to be executed to provide the desired functions for a particular document inserter. The tables of data in the configuration PROM are provided from customer responses to a series of questions regarding the inserter configuration and the functions to be performed thereby. During operation, the software of the supervisory program will access the data tables from the configuration PROM to determine which routines of the supervisory program are to be executed. Further details regarding the operation of the supervisory program within the multi-station document inserter may be obtained by referring to the above-noted co-pending patent application entitled "UNIVERSAL MULTI-STATION DOCUMENT INSERTER". In addition, a flow chart of the supervisory program is illustrated in FIG. 5.

Figure 3:
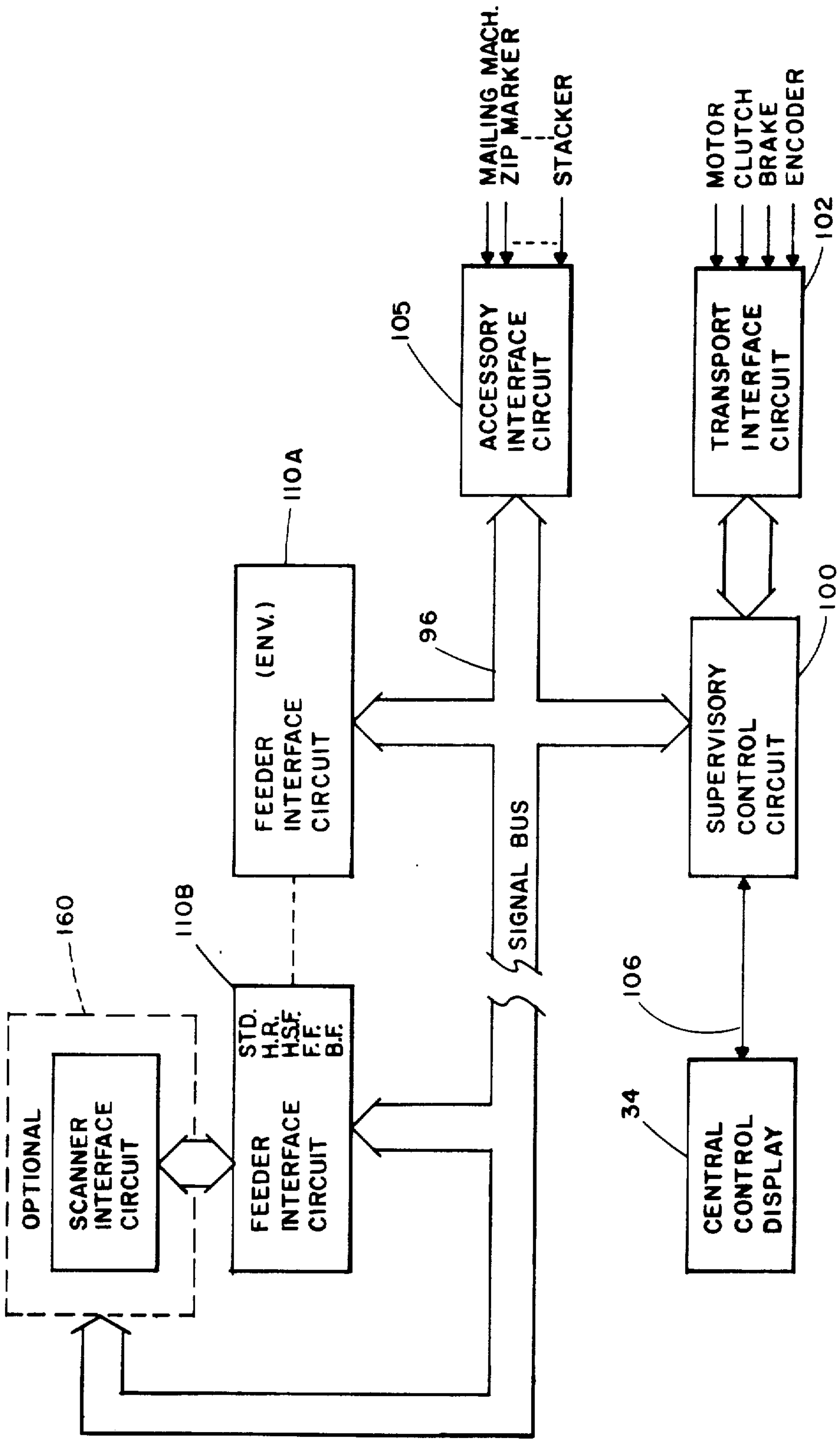
FIG. 3 is a block diagram of the electronic circuits employed with the multi-station document inserter.

Referring to FIG. 3, a block diagram of the interconnection of the interface circuits for the multi-station document inserter 40 is illustrated. The supervisory control circuit or central microprocessor 100 interacts directly with transport interface circuit 102 to activate the transport motor, clutch and brake, as well as receive pulses from the encoder 198 (see FIG. 2, for control of the transport deck 30 (see FIG. 1). Interactive communication between the supervisory control circuit 100 and the central control display 34 is provided over the standard communication line 106. Advantageously, the central control display 34 is a finger touch display switch. Communication between the supervisory circuit 100 and the feeder interface circuits 110B for documents and envelope interface circuits 110A for envelopes and accessory interface circuit 105 is maintained over the signal bus 96. Additionally, the supervisory control circuit 100 communicates with the scanner interface circuit 160 through the signal bus 96. The scanner interface circuit 160 also communicates with the feeder interface circuit 110B. The scanner interface circuit 160 is described in more detail in the above-noted copending application entitled "SCANNER INTERFACE CIRCUIT FOR UNIVERSAL MULTI-STATION DOCUMENT INSERTER".

Figures 4, 4A:
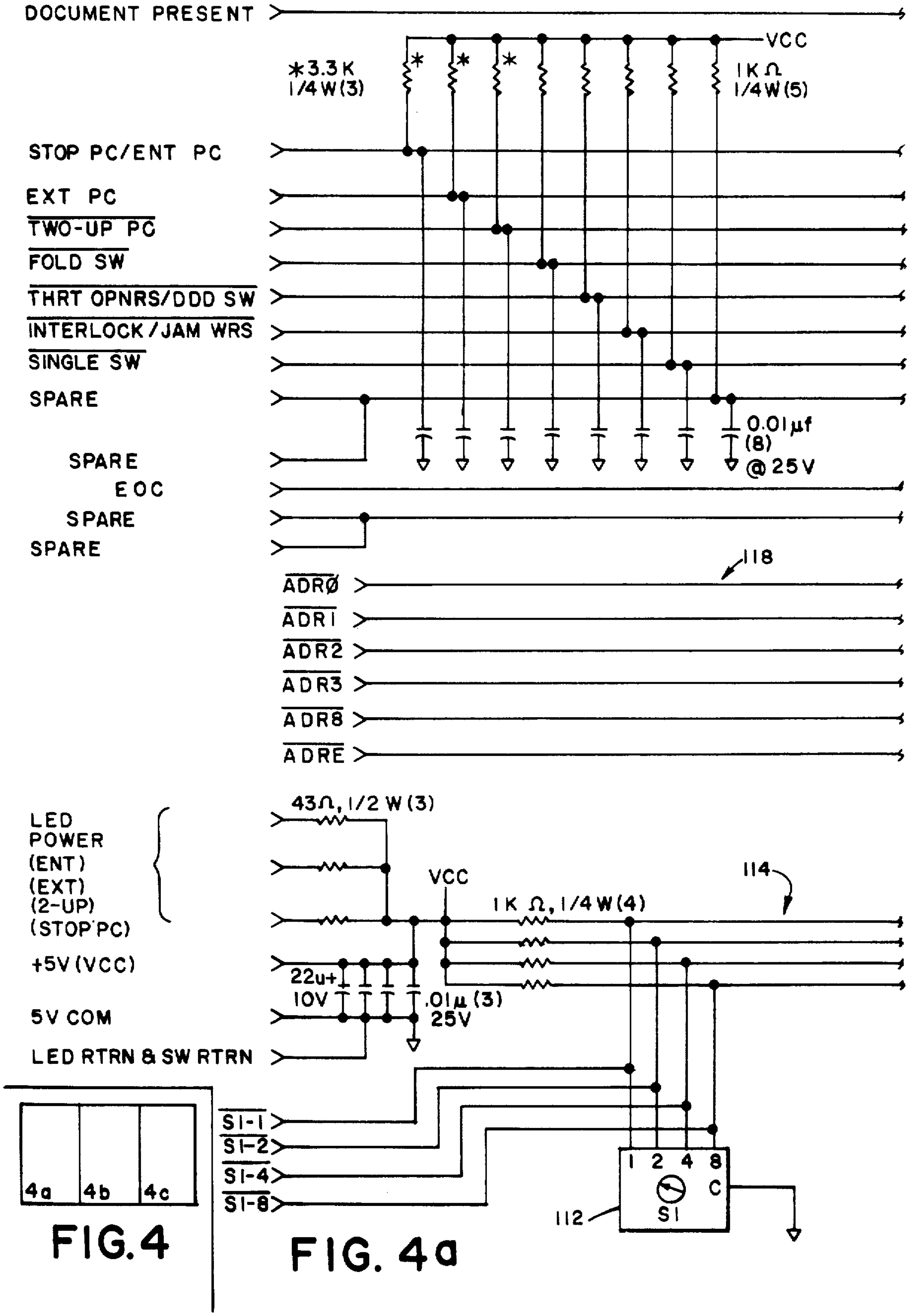
FIG. 4*a*–4*c* are schematic diagrams of the universal feeder interface circuit according to the present invention.
Figure 4B:
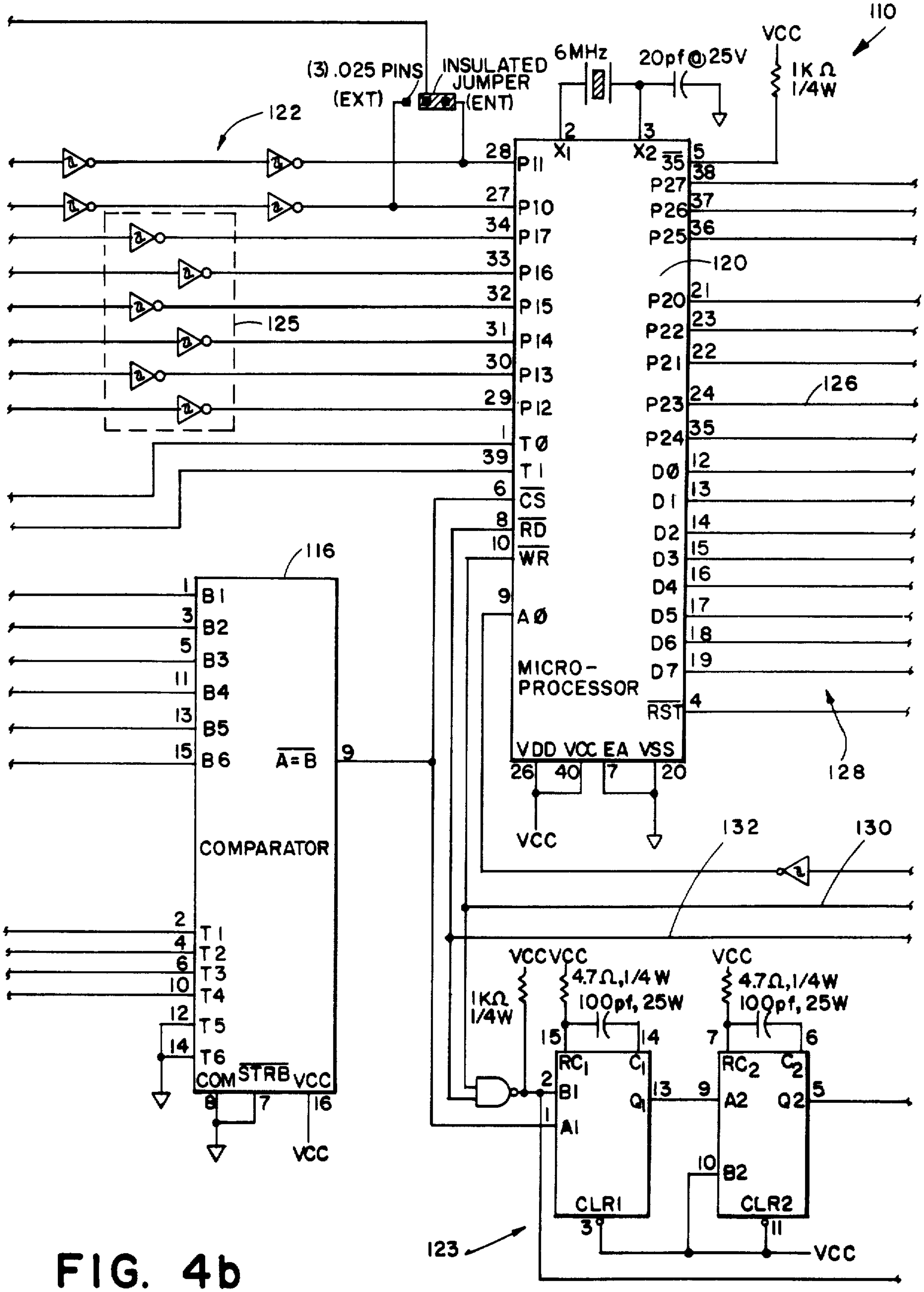
Figure 4C:
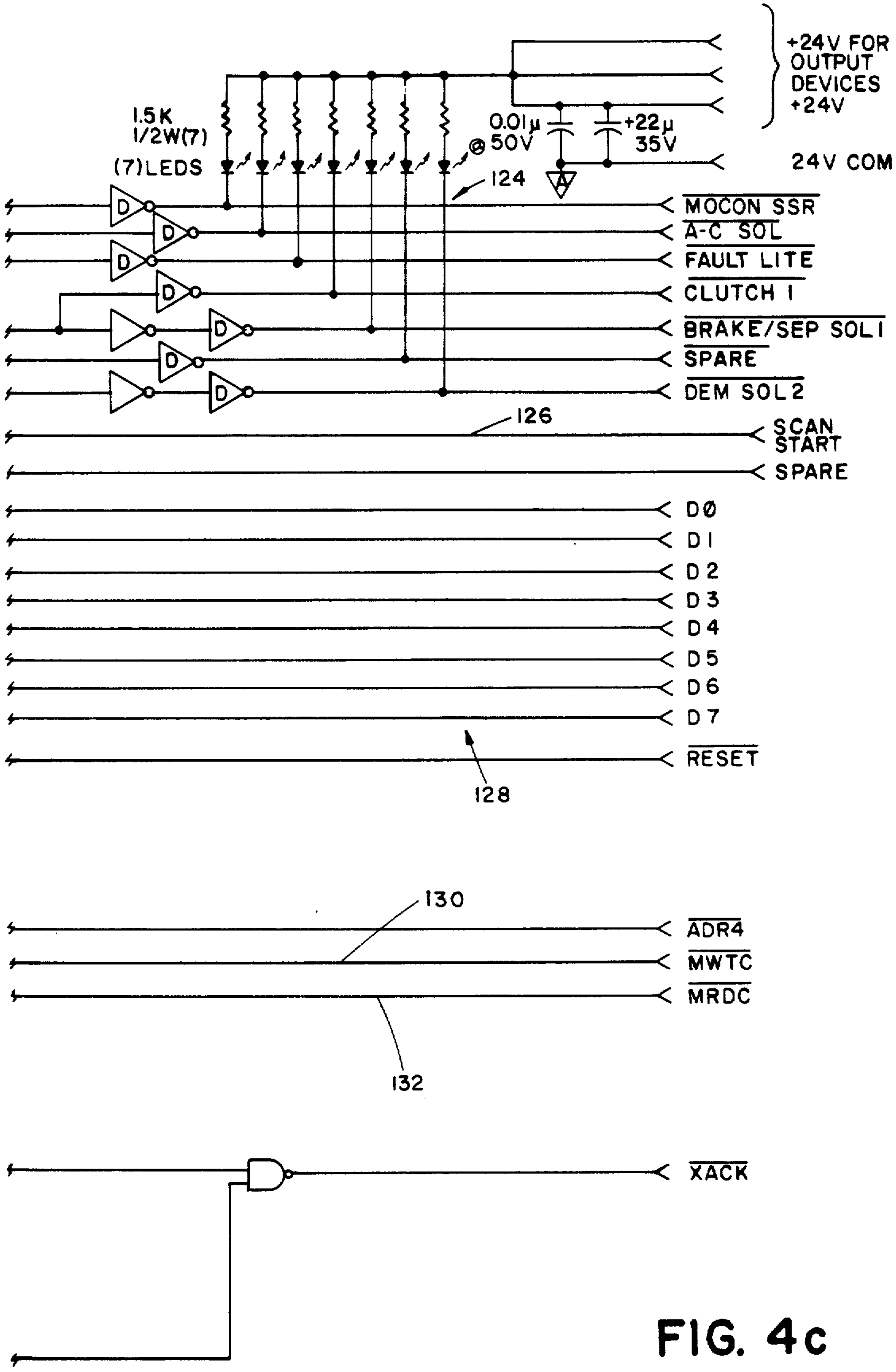
Figure 5A:
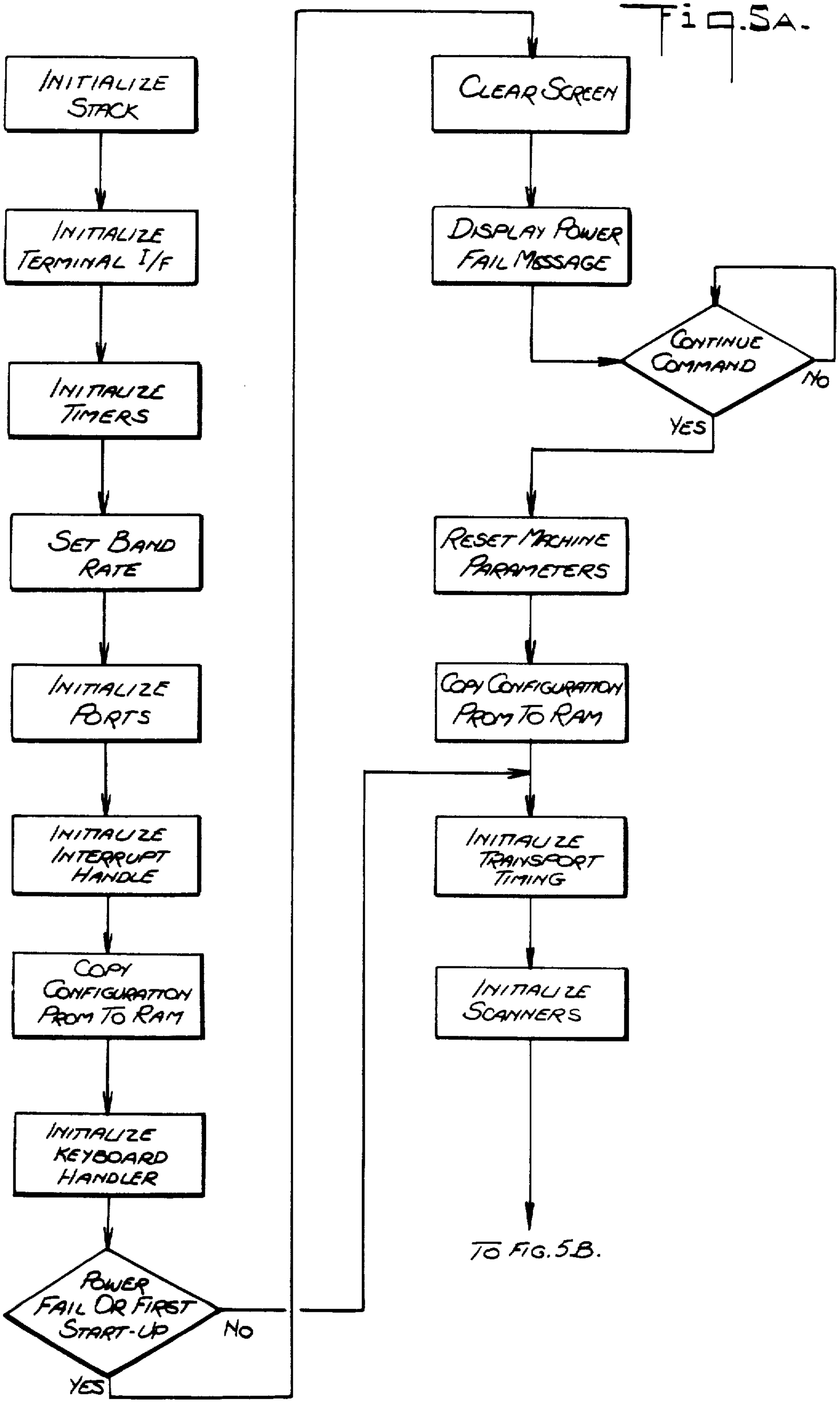
FIG. 5*a*–5*n* are flow charts of the supervisory program employed in the supervisory control circuit of the multi-station document inserter.
Figure 5B:
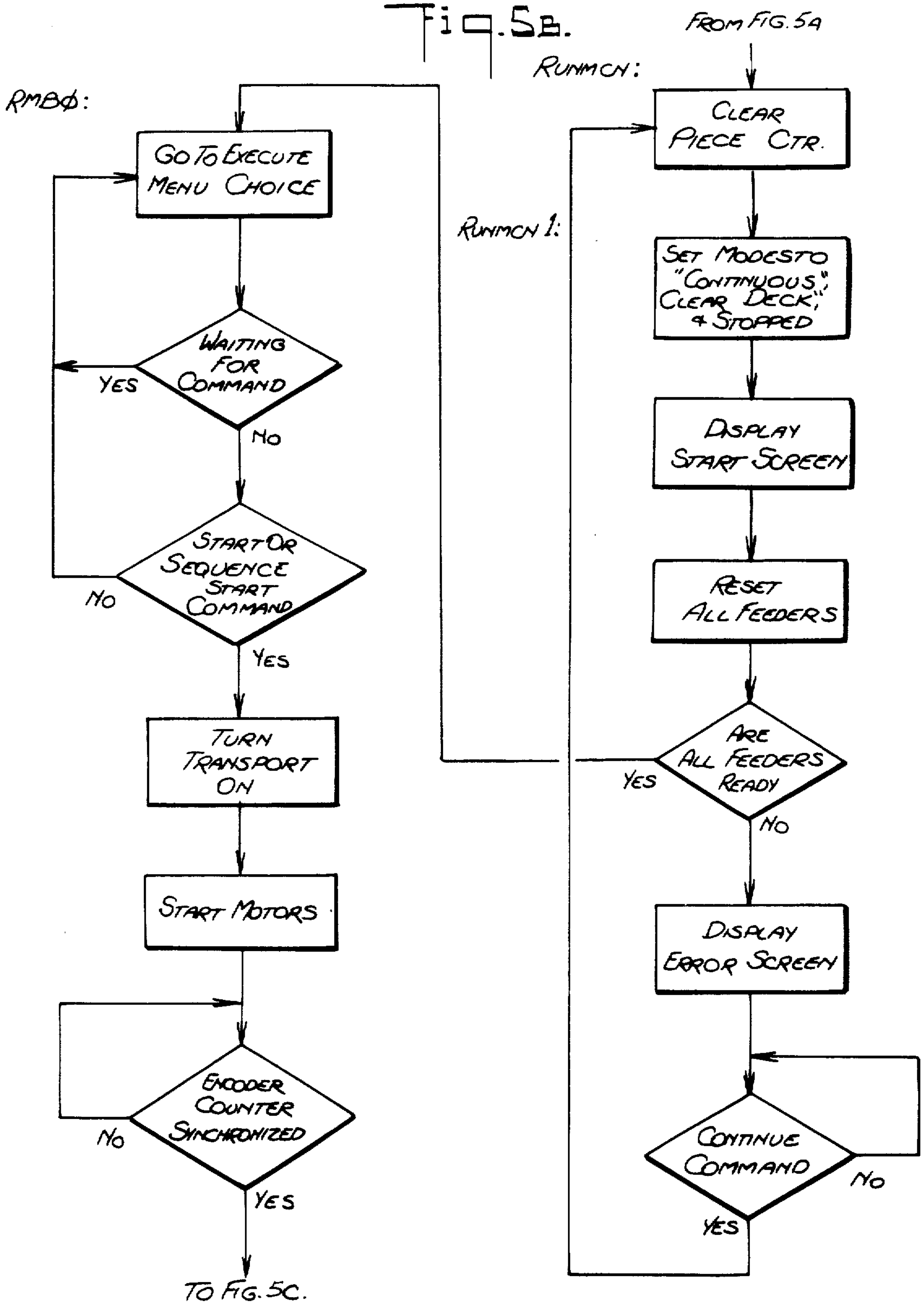
Figure 5C:
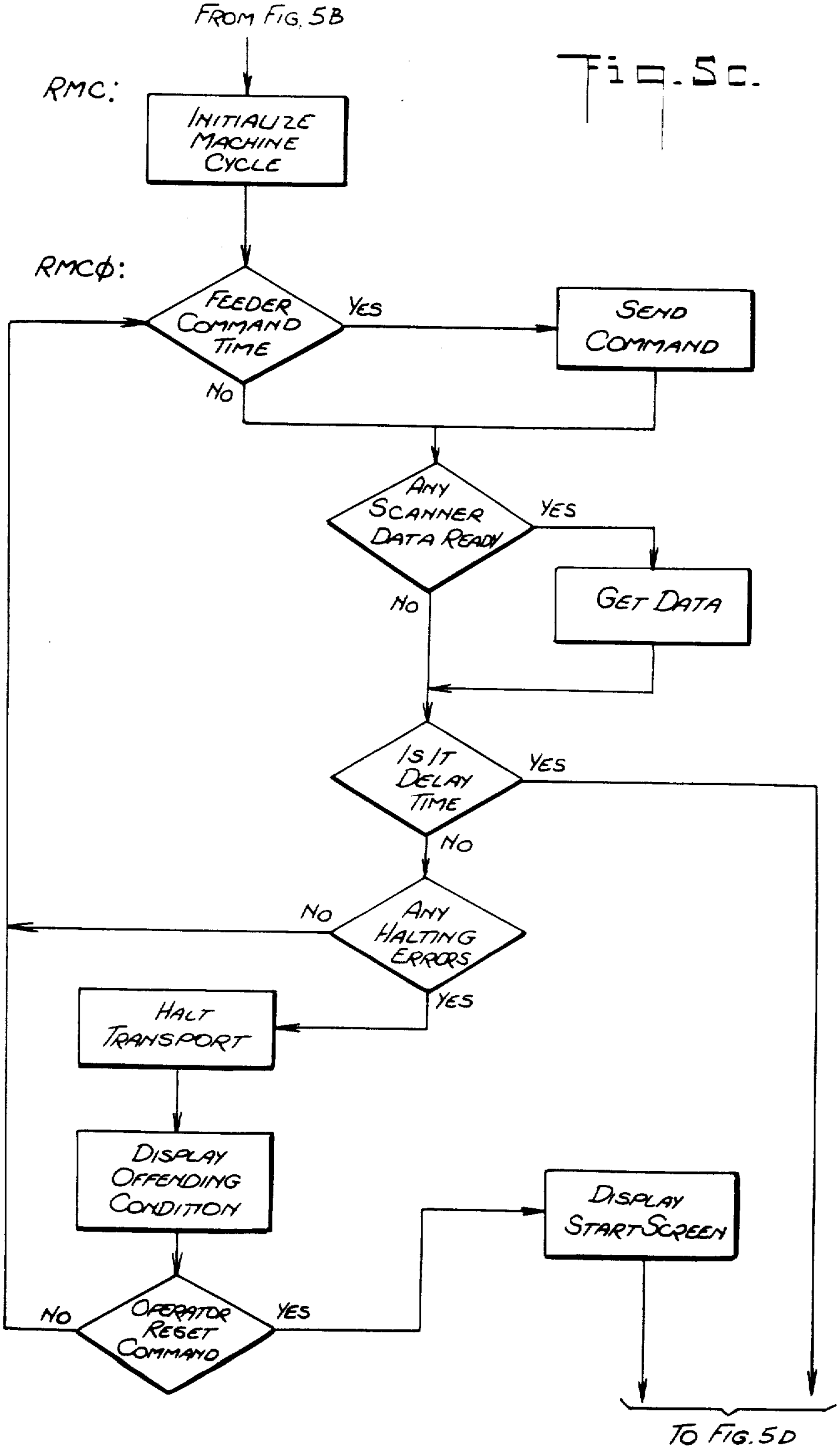
Figure 5D:
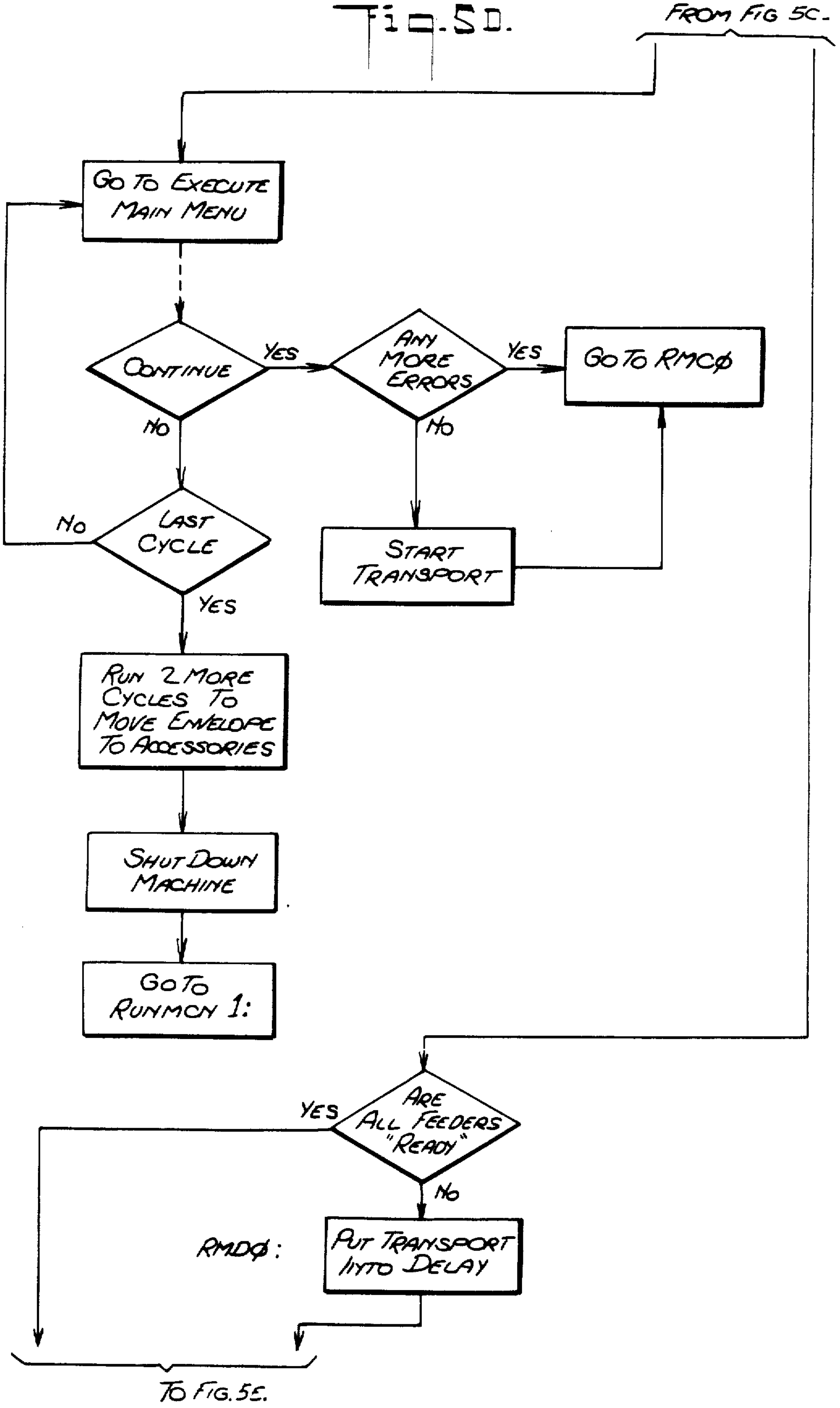
Figure 5E:
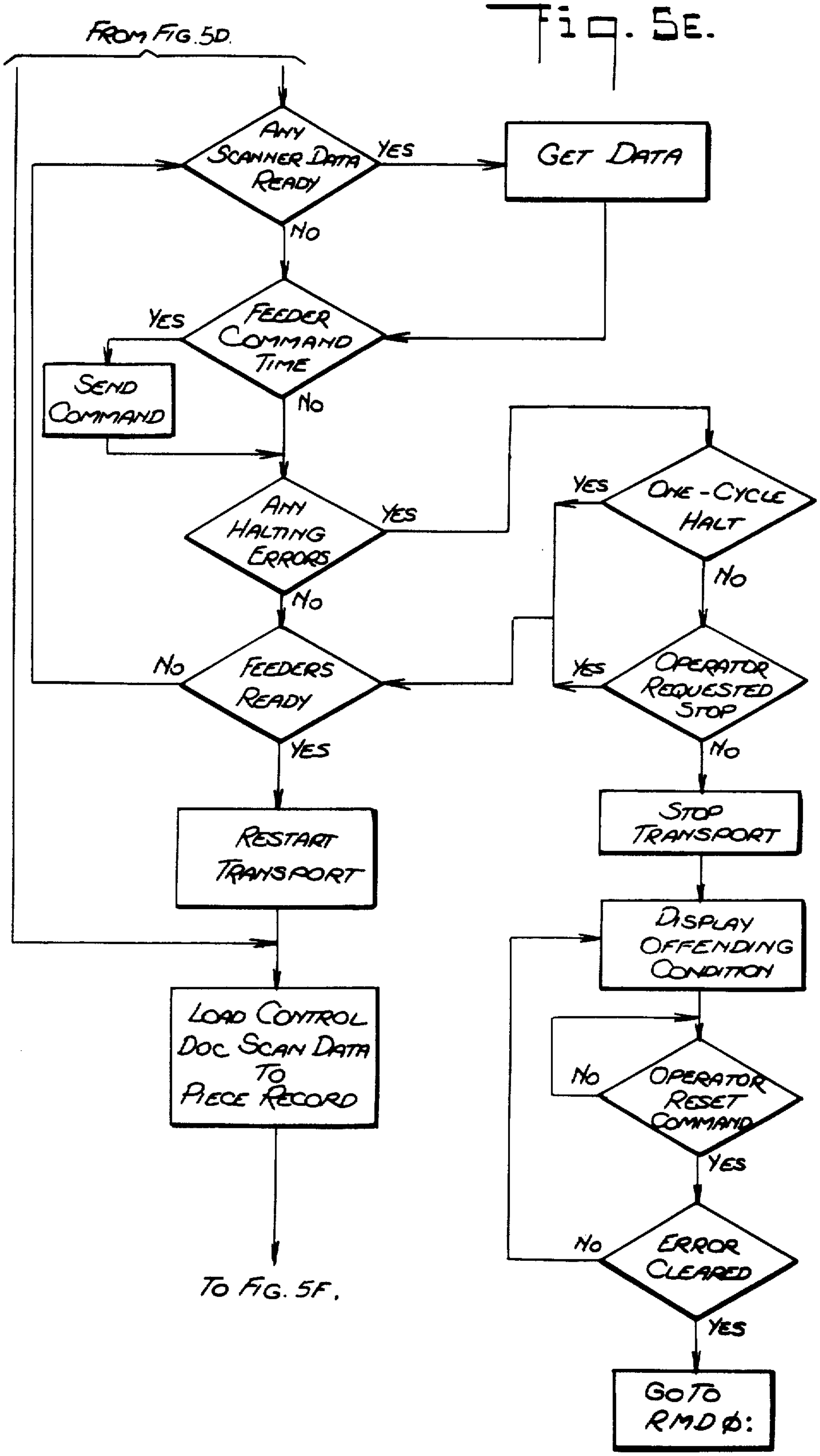
Figure 5F:
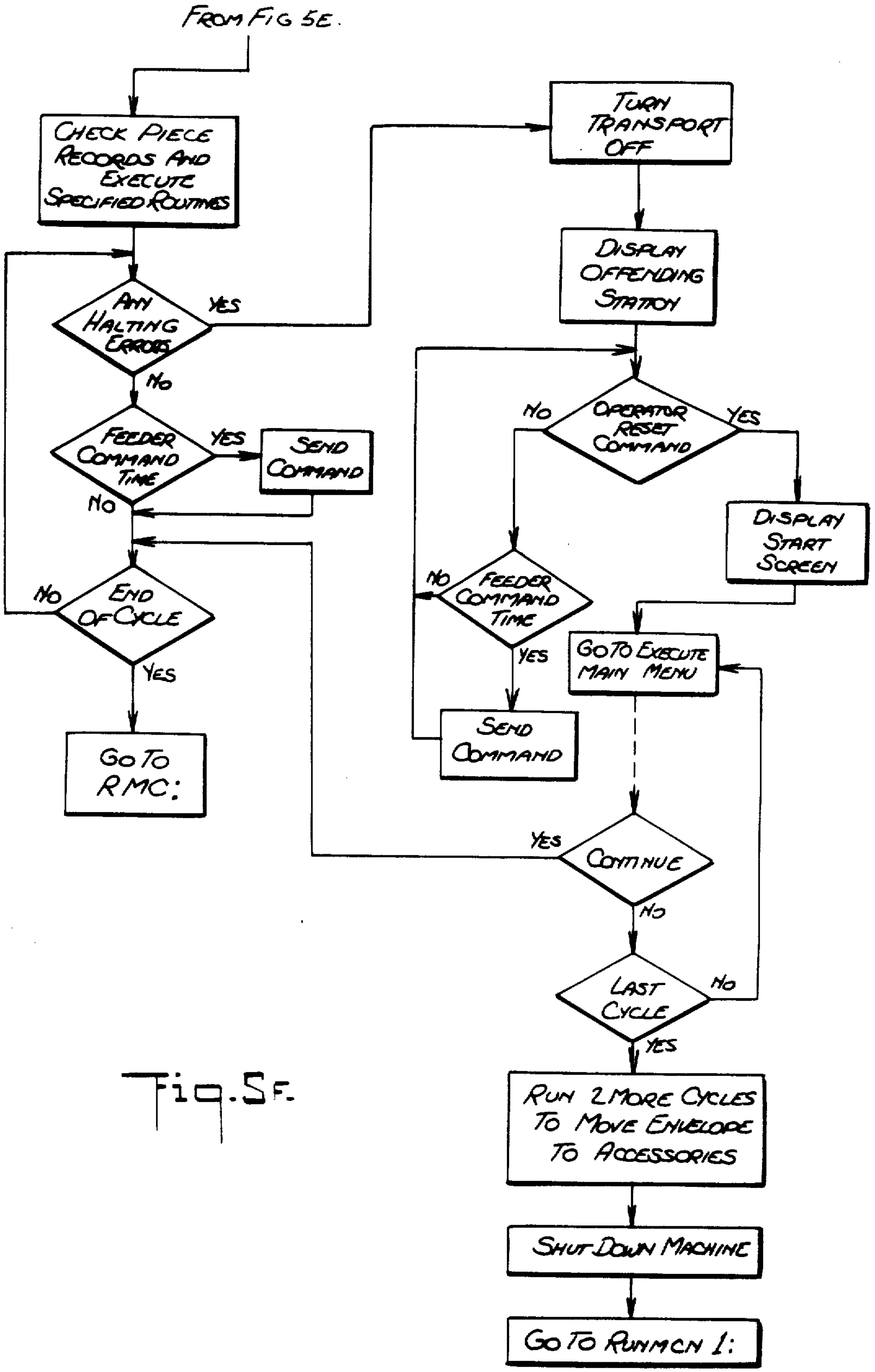
Figure 5G:
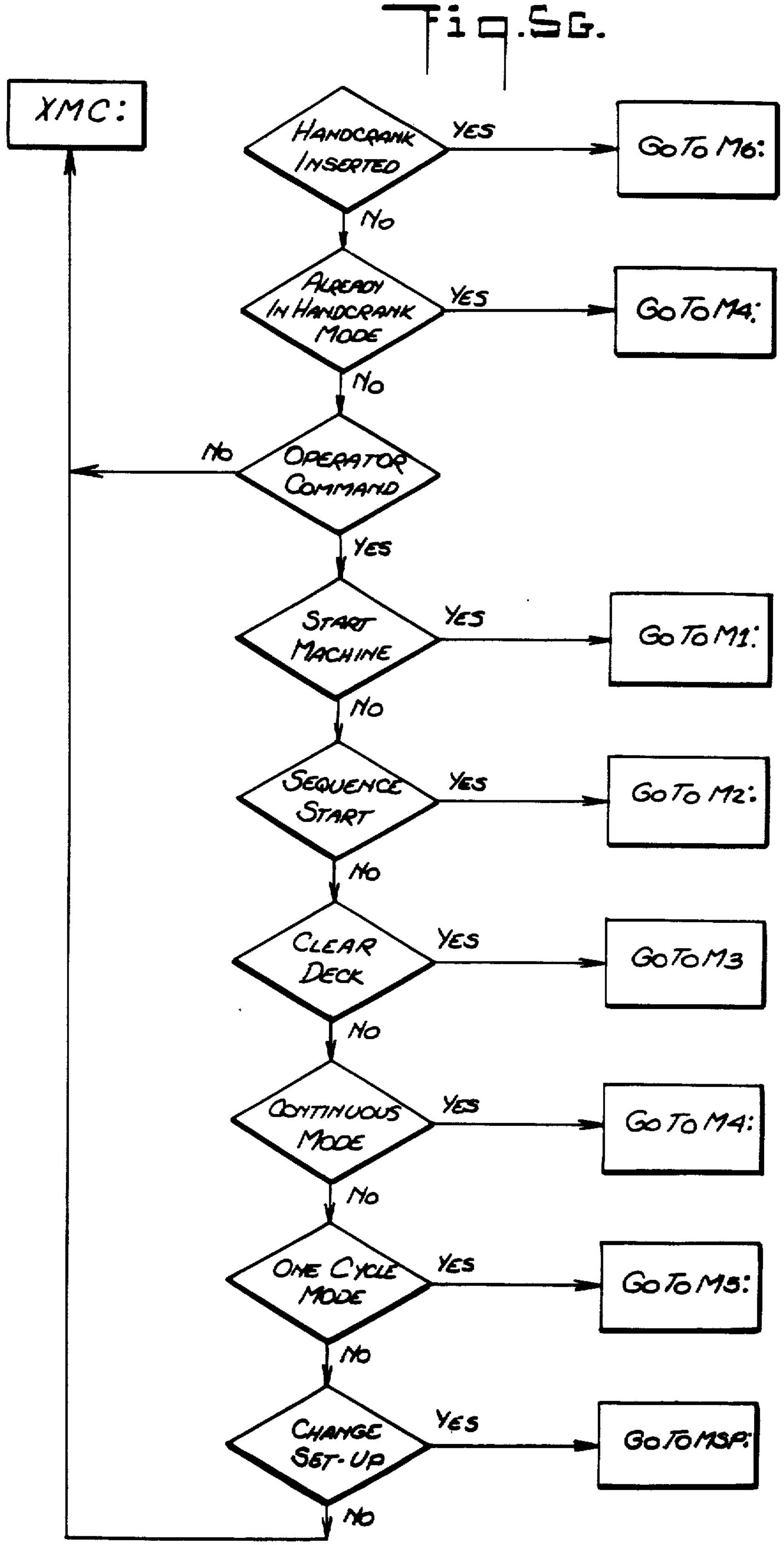
Figure 5H:
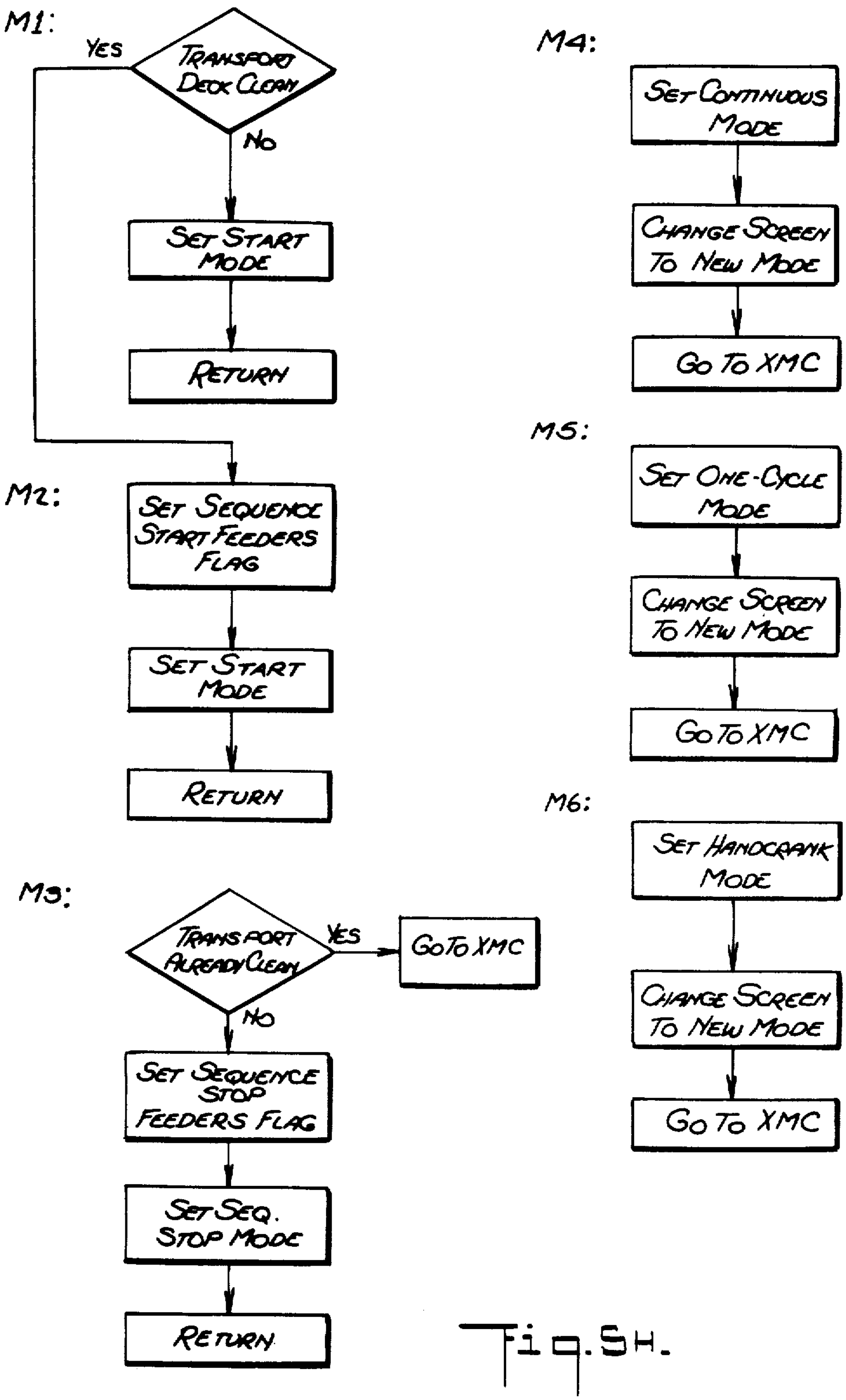
Figure 5J:
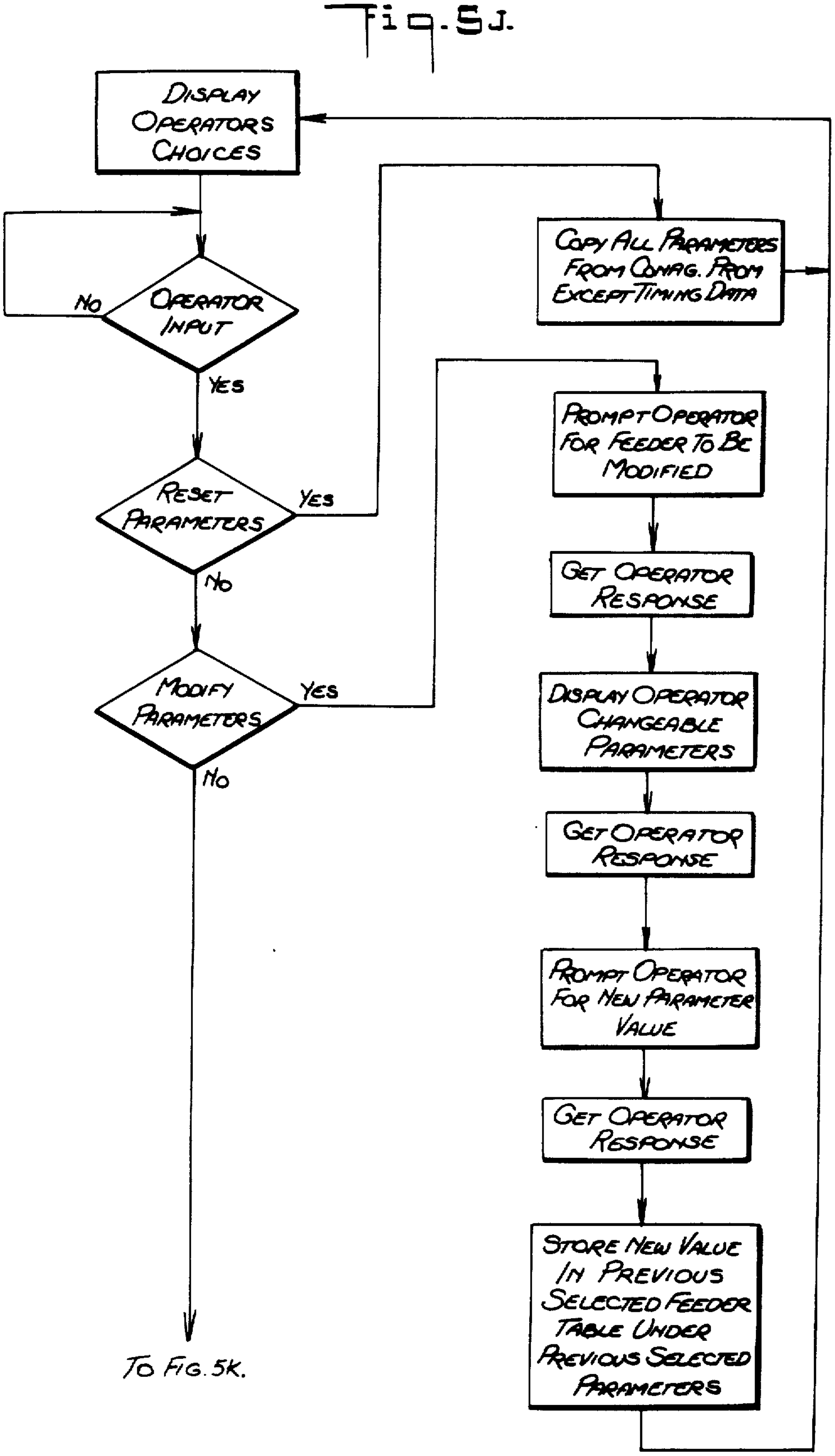
Figure 5L:
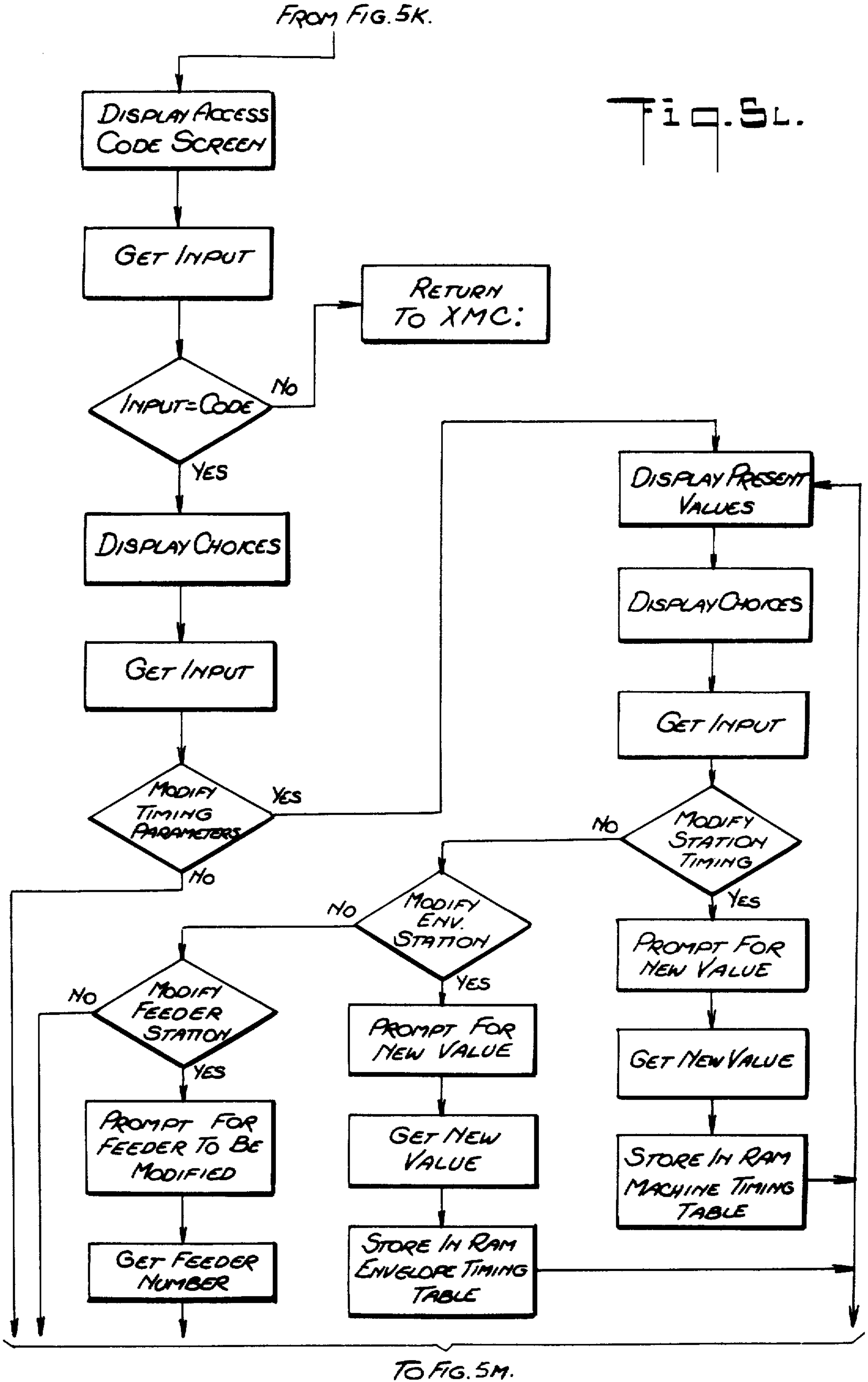
Figure 5M:
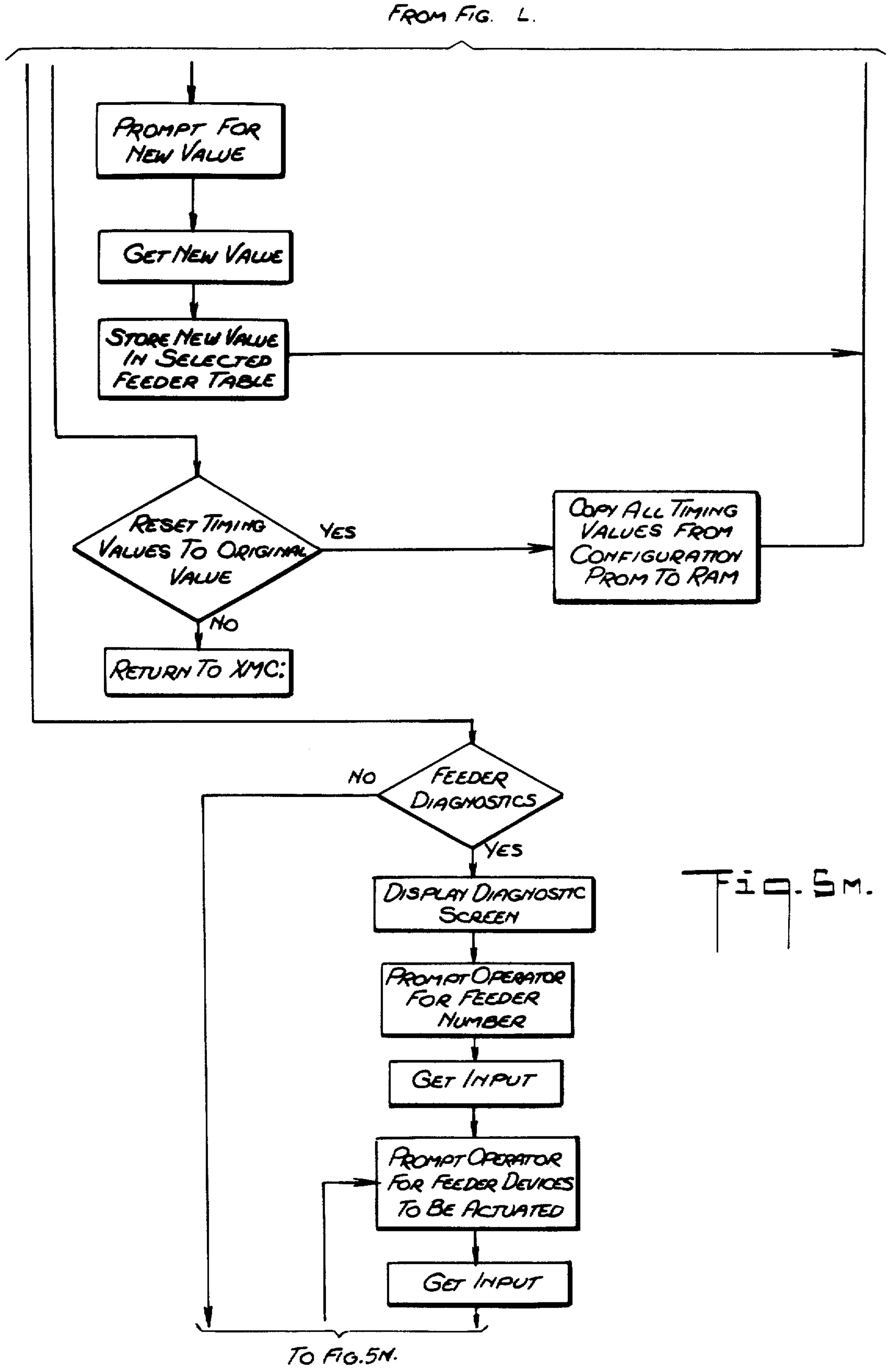
Figure 5N:
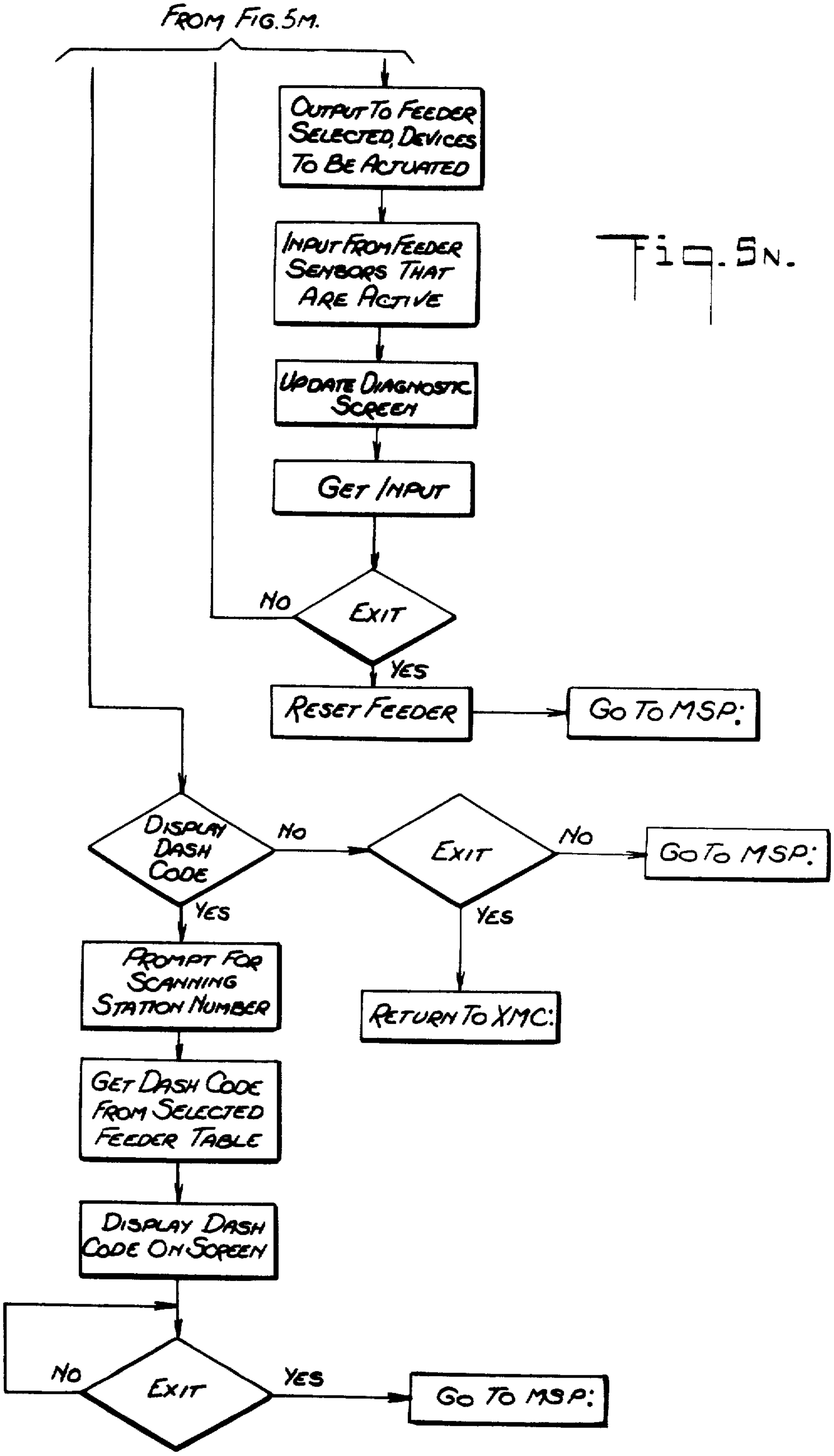
Figure 6A:
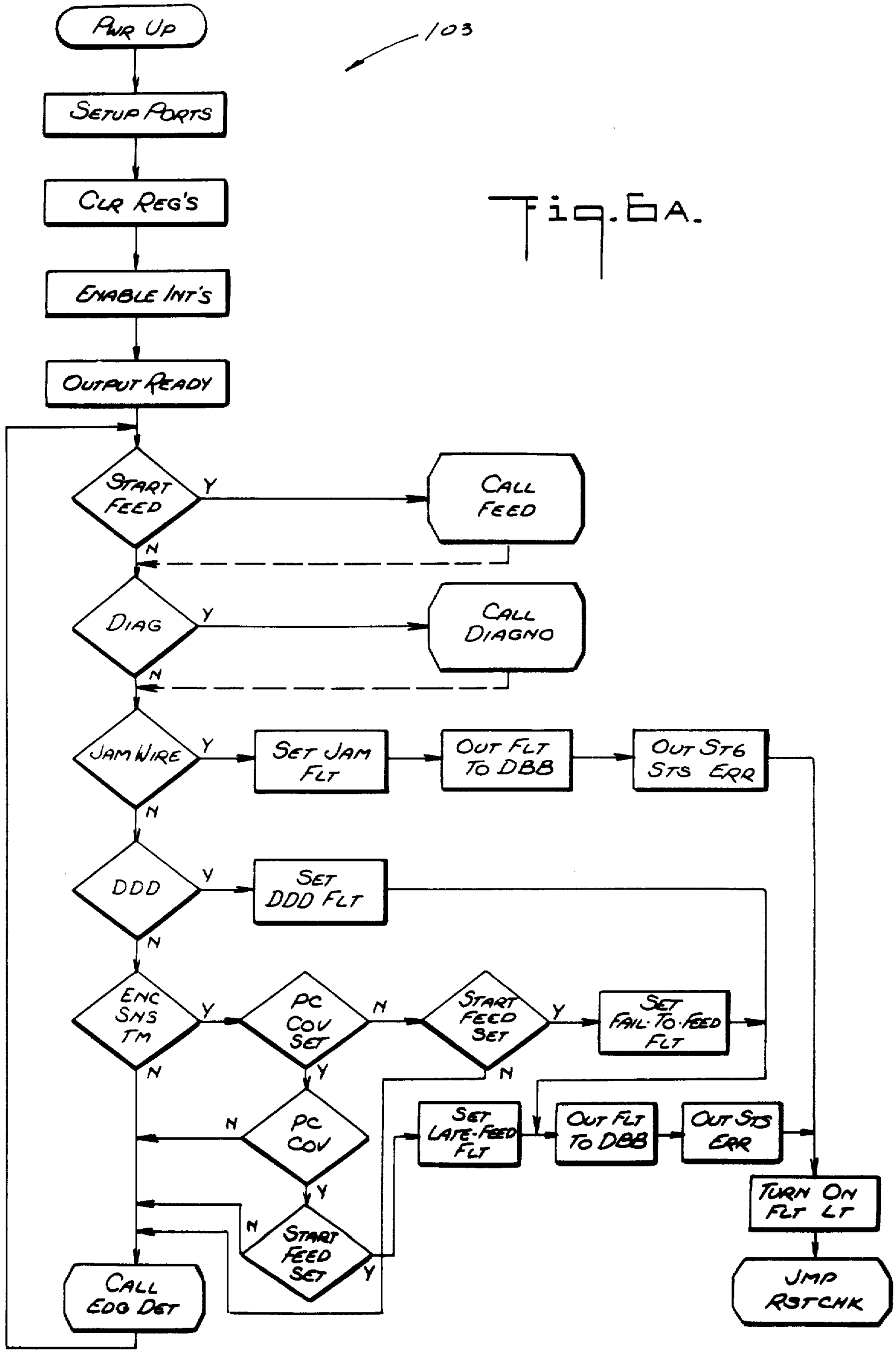
FIG. 6*a*–6*e* are flow charts of the feeder program for use with a high ratio feeder.
Figure 6B:
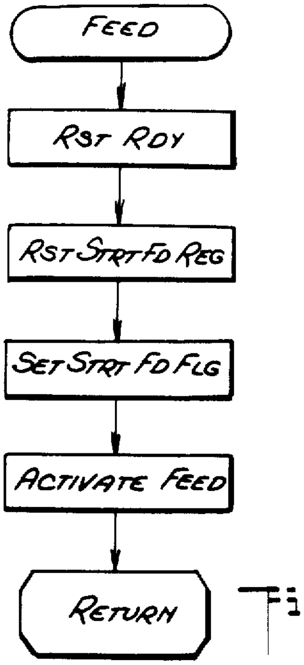
Figure 6C:
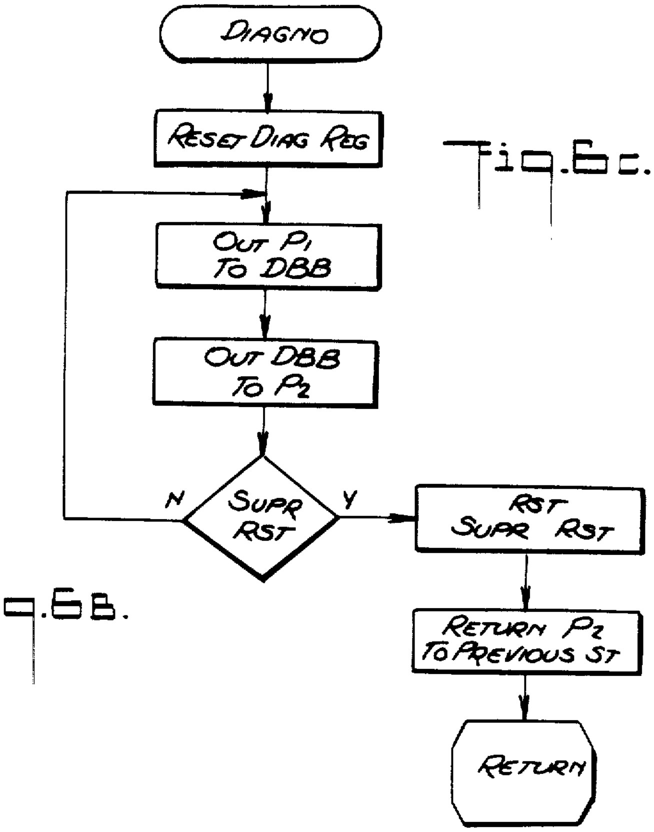
Figure 6D:
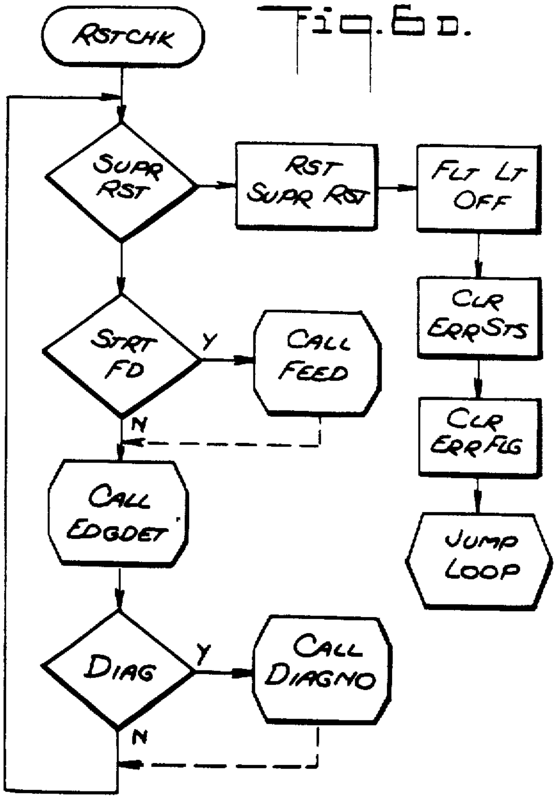
Figure 6E:
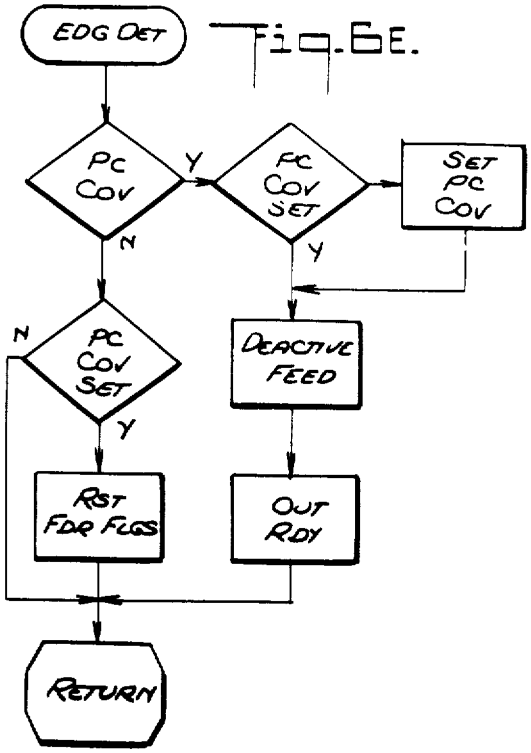
Figures 7A, 7B:
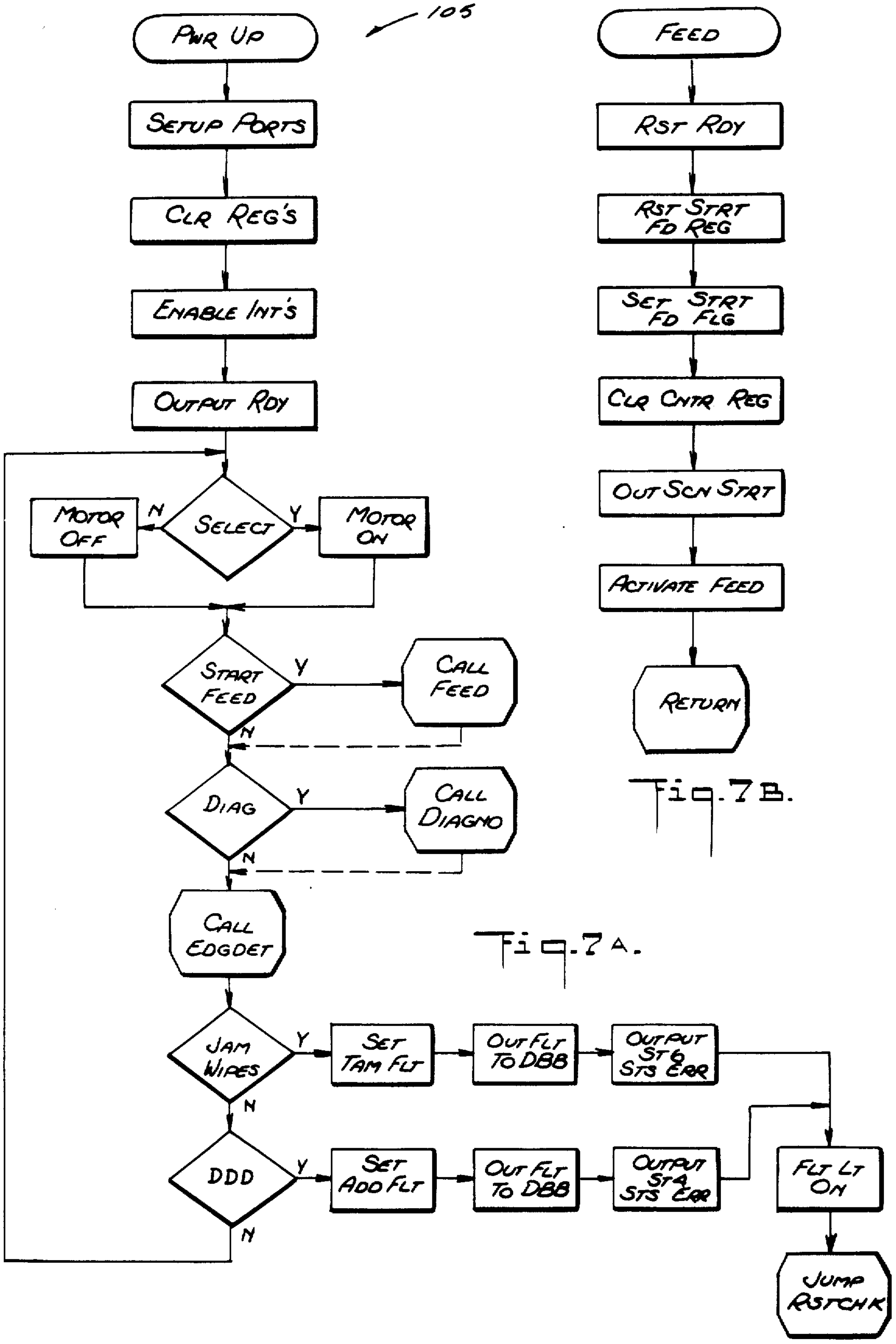
FIG. 7*a*–7*e* are flow charts of the feeder program for use in a high speed feeder.
Figure 7E:
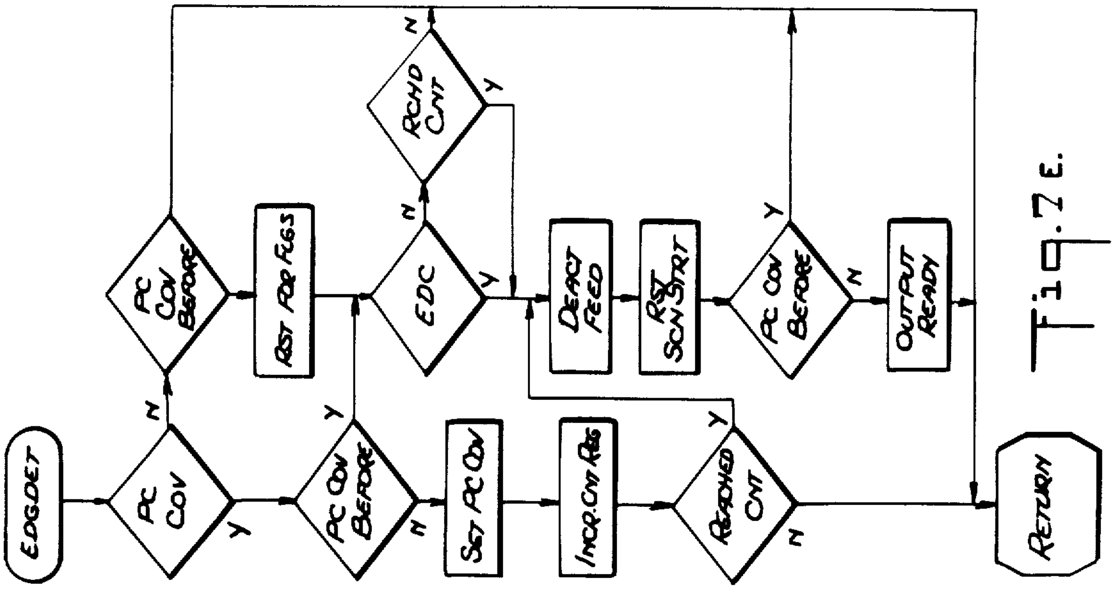
Figure 7D:
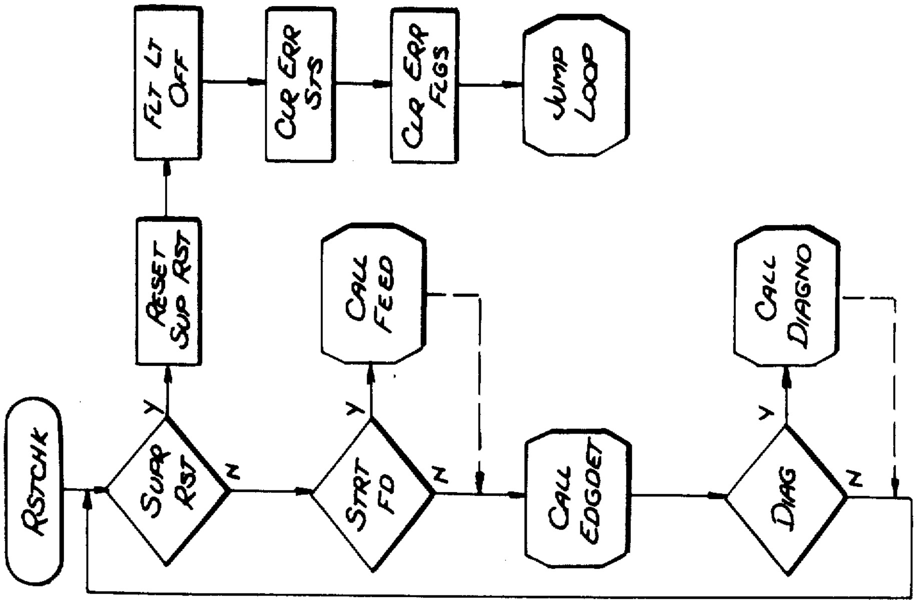
Figure 7C:
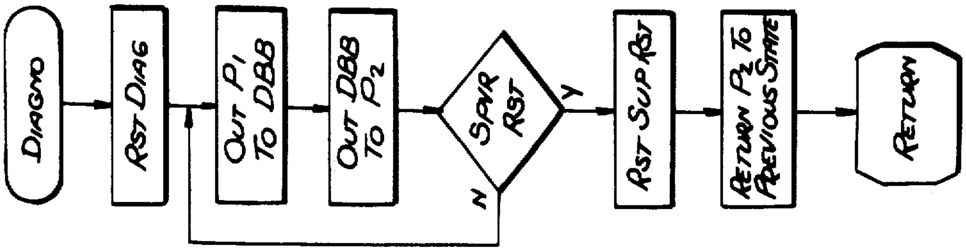
Figures 8A, 8B:
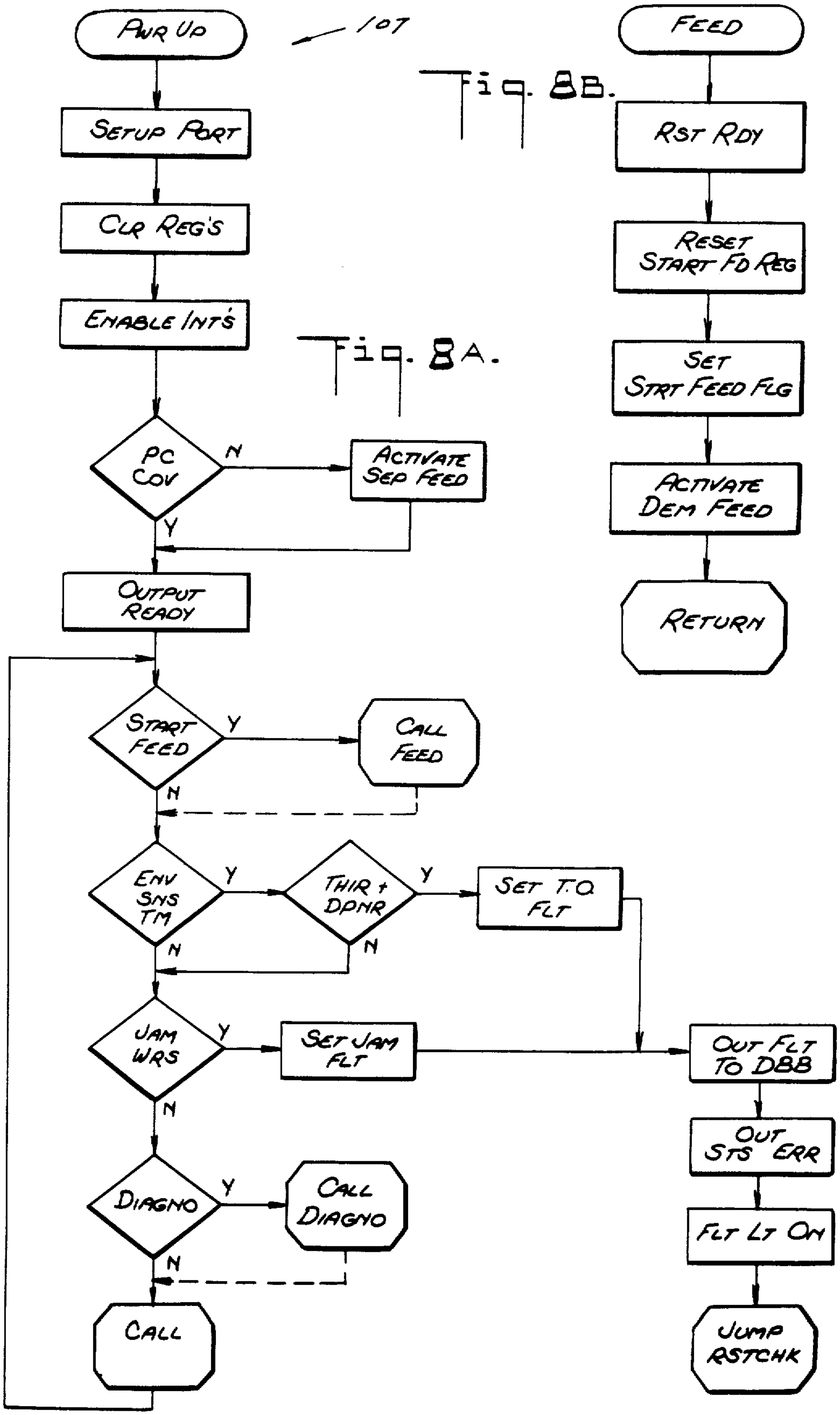
FIG. 8*a*–8*e* are flow charts of the feeder program for use in an envelope feeder.
Figure 8C:
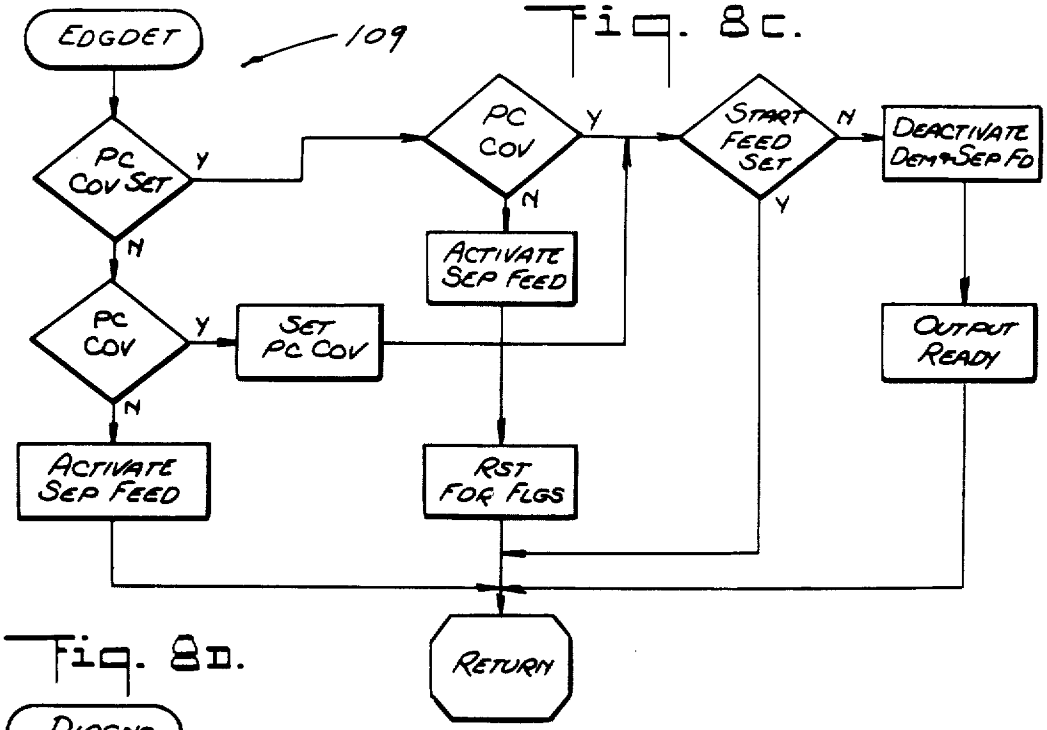
Figure 8D:
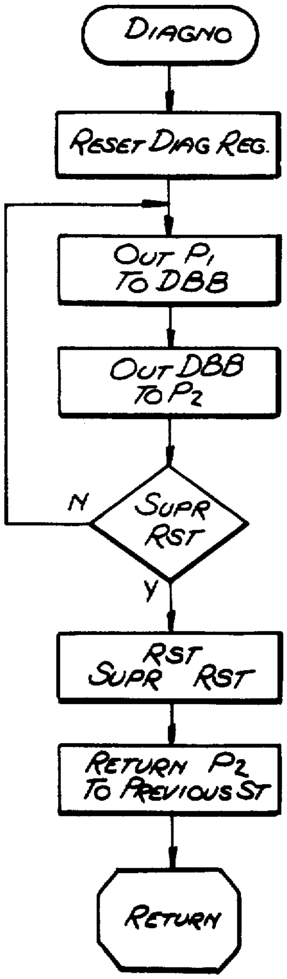
Figure 8E:
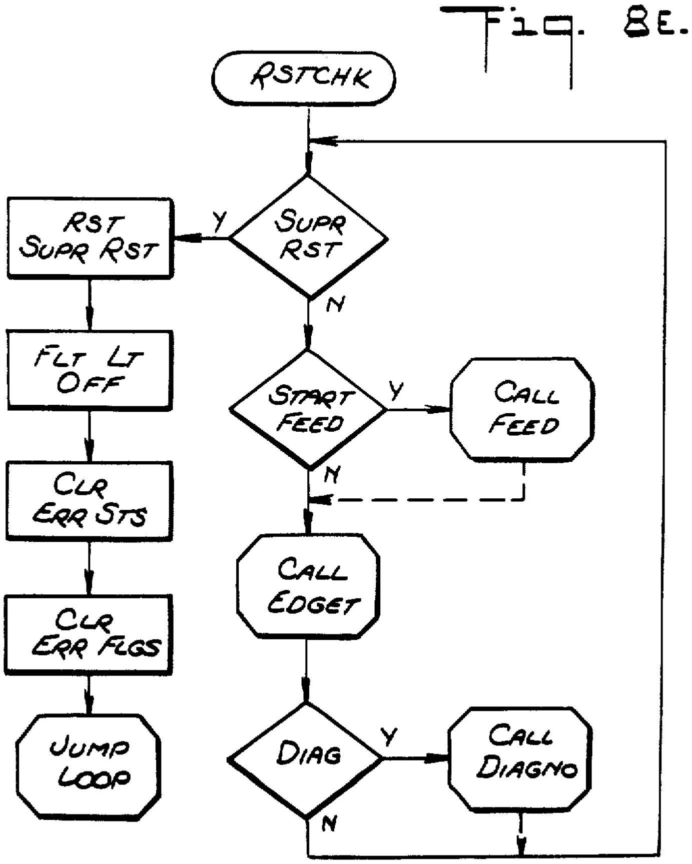
Figures 9A, 9B:
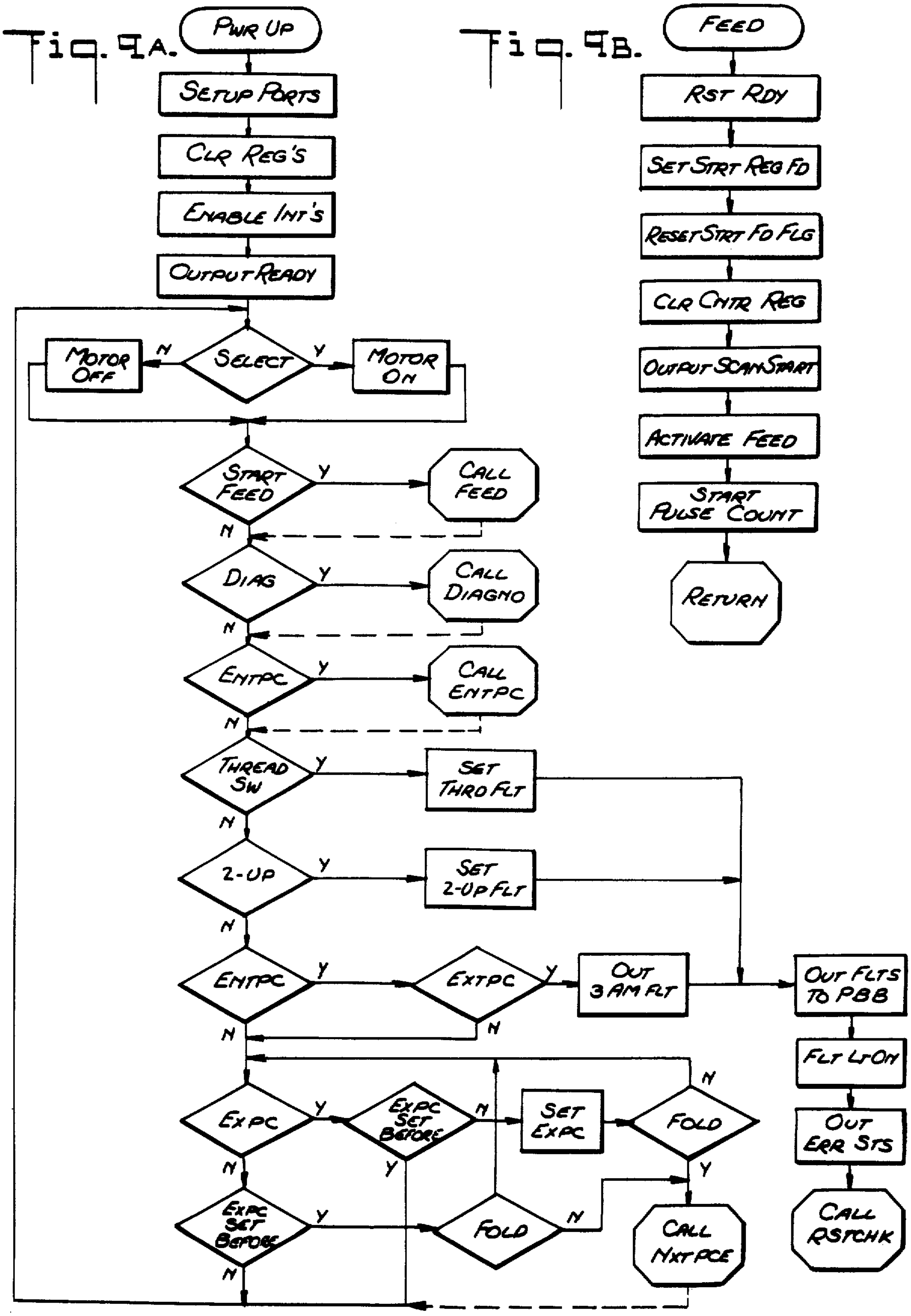
FIG. 9a–9f are flow charts of the feeder programs for use in a burster-folder.
Figure 9E:
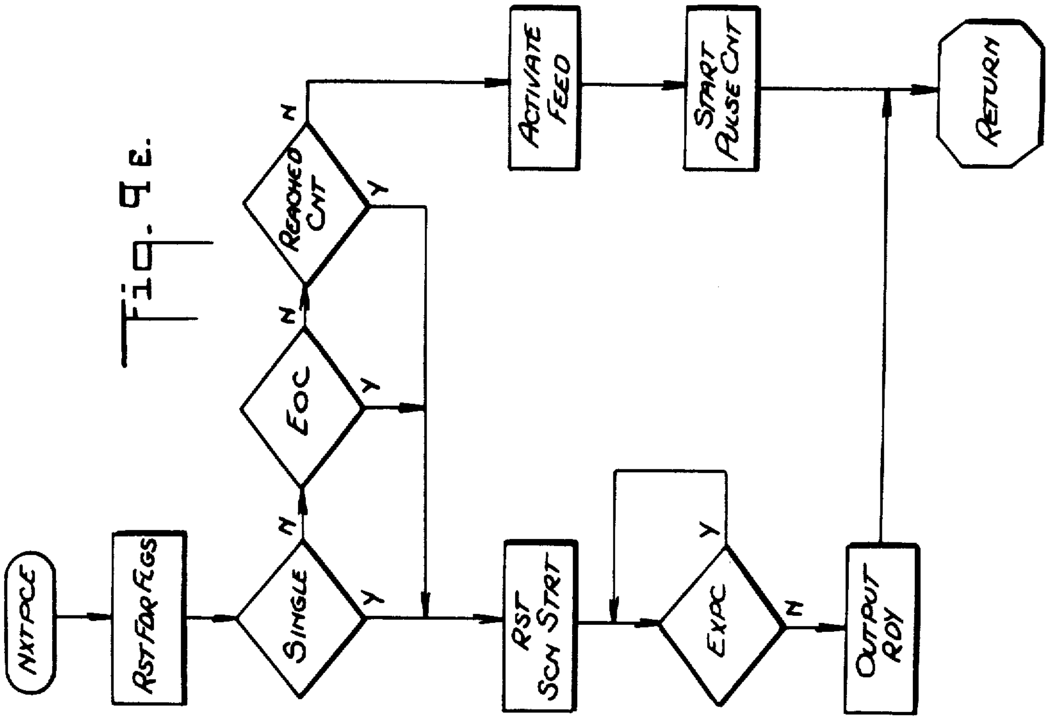
Figure 9D:
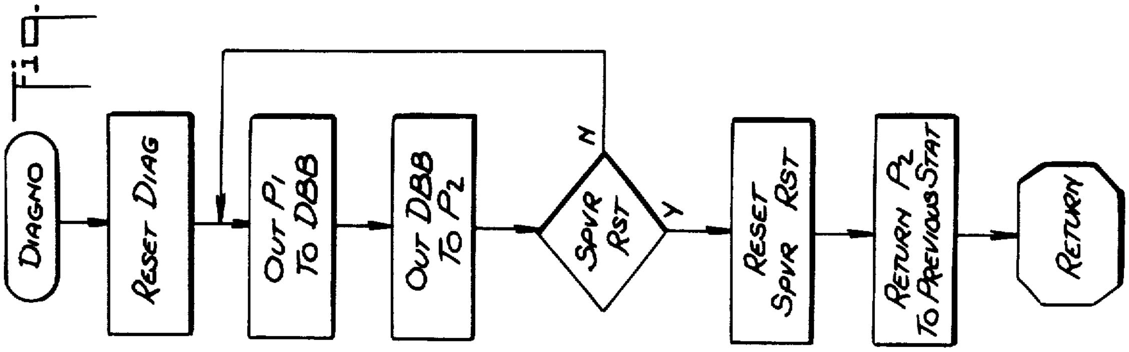
Figure 9C:
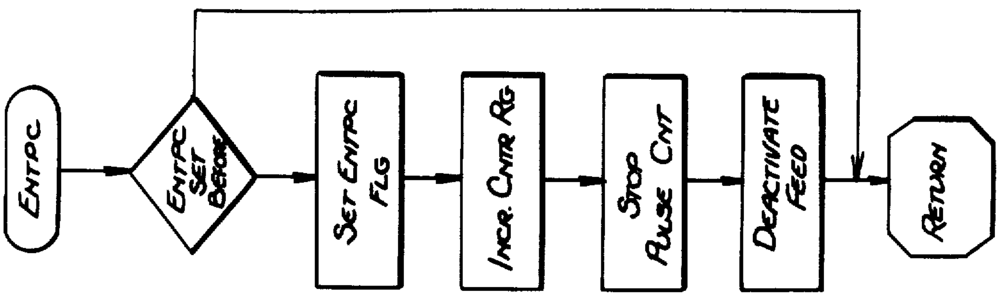
Figure 9F:
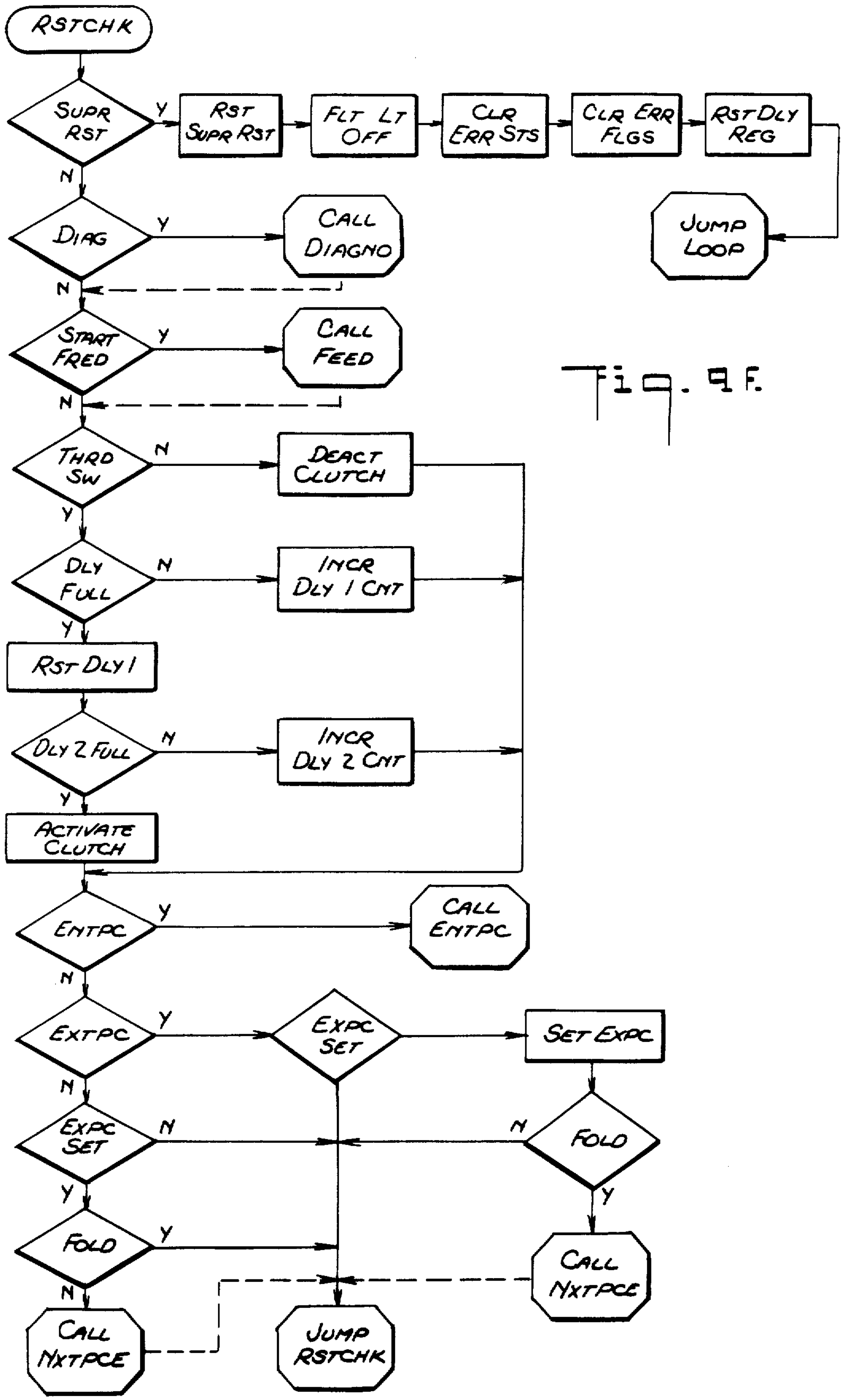

Referring to FIG. 4, a universal feeder circuit for use with all of the feeder interface circuits 110A and 110B shown in FIG. 3 is illustrated generally at 110. The flow chart of the program for a high ratio feeder is illustrated in FIG. 6 as 103; the flow chart of the program for a high speed feeder is illustrated in FIG. 7 as 105; the flow chart of the program for the envelope feeder is illustrated in FIG. 8 as 107; and the flow chart of the program for a burster-folder is illustrated in FIG. 9 as 109. The program listing for the aforementioned feeders are set forth in the accompanying microfiche appendix. The primary function of the interface circuit 110 is to provide communications between the central microprocessor 100 and the various feeder modules 48 through 76. A secondary function is to receive communication from the processor 100 and use this information to control the functioning of the feeder modules. The feeder interface circuit 110 is the same for each feeder station 48 through 76, except that the address code for each feeder station is unique. This is accomplished by means of a thumb wheel switch 112 which is preset with a unique address code for each feeder station. This unique address code is supplied to a first set of inputs 114 to a comparator 116. The comparator 116 receives address data on a second set of inputs 118 from the central microprocessor 100 over signal bus 96. If there is a coincidence between the unique address and address data, the comparator 116 will provide an output signal to microprocessor 120 and one shot circuit 123. When the one shot circuit 123 receives a signal from the comparator 116, the one shot circuit 123 provides an internal transfer acknowledge timing signal to the central microprocessor 100 which indicates that the feeder module has received data therefrom. The output signal from comparator 116 activates the CS (chip select) input of the microprocessor 120 which activates the microprocessor 120. The microprocessor 120 also receives inputs on input lines 122 from photo cells and/or switches (not shown) and in response thereto transmits output signals to output lines 124 for performing certain functions at the feeder station in accordance with the programs stored therein. Resistors and capacitors on lines 122 provide debouncing the input signals which are fed through Schmidt trigger devices 125 to smooth the signals. As seen in FIG. 4, these functions include actuation of motors, clutches, brakes, fault lights and solenoids associated with that feeder station. The microprocessor 120 also transmits a start scan signal 126 to its associated scanner interface circuit which will be described in more detail in connection with above-mentioned copending application entitled "SCANNER INTERFACE CIRCUIT FOR UNIVERSAL MULTI-STATION DOCUMENT INSERTER".

The microprocessor 120 transmits output data on data lines 128 to the central microprocessor 100 over signal bus 96 to advise the central processor 100 of the functions implemented by the feeder module being accessed and to store the data for the document in the document table in the RAM of the central processor 100. Additionally, the microprocessor 120 also receives its feed function data from the central microprocessor 100 over the same data lines 128. Specifically, the data from the central processor 100 is read and written into the microprocessor 120 over memory write and memory read lines 130 and 132, respectively.

As is apparent from FIGS. 6 through 9 and the accompanying program listings in the microfiche appendix, each different type of feeder will have a different program which is implemented by a resident or distributed processor 120. Advantageously, with such an arrangement there is intelligence present at each feeder module so that the commands from the supervisory program are essentially a feed command with the individual feeder modules being responsive thereto to perform their feeding functions. This facilitates a standard supervisory program format which is usable with individually programmed feeder modules to readily provide a customized inserter without requiring any re-programming or rewiring.

Referring to FIG. 2, the accessory interface 105 receives input signals from the signal bus 96 and power bus 98 and provides output signals to activate various accessories such as postage meters 78 and 80, a rotatable envelope table, and power stackers 82 through 94.

To commence inserter operation, an on/off key switch is activated with the key being removable in the off position. The operator then starts the inserter 40 by first selecting a continuous or one cycle switch and then activating a sequence start switch on the central control display 34 when its sequence start switch is activated the central processor 100 sends a command to activate the last feeder module 76; that is, the feeder module 76 most remote from the envelope feeder 48 is activated to feed the required number of documents. The next feeder module 74 in sequence is then activated on command from the central processor 100 and the documents are fed from the feeder 74. Document feeding continues, sequentially in this fashion from one feeder module to the next to provide a complete coalation of documents at the envelope feeder 48. It should be understood that the control document scanner of feeder module 76 is initialized during power up of the inserter.

In contrast when the inserter is to be shutdown, the operator activates a clear deck switch on the central control display 34 and the same process which occurred with the sequence start sequence is repeated, with the exception that the feeder station 76 most remote from the envelope feeder 48 is deactivated after feeding the desired documents and then feeders 4 through 50 are deactivated sequentially to provide a complete collation of documents at the envelope feeder 48 for insertion therein to insure that a partial collation of documents is not left on the transport deck of the document inserter. Operation of the inserter 40 then ceases. Further details regarding the sequence start and clear deck (sequence stop) modes can be obtained from the above-noted application entitled "MULTI-STATION DOCUMENT INSERTER WITH AUTOMATIC STARTUP AND SHUTDOWN DOCUMENTATION COLLATION SEQUENCES".

After the sequence start cycle is completed the inserter 40 continues its operation. If the operator chooses the sequence start cycle can be skipped and a start transport switch can be activated which places inserter 40 in non sequence mode. With either approach, the scanner interface circuit 160 of the control document feeder 76, the last feeder in FIG. 2, reads the dash code marks on the document and transmits a signal to the central processor 100 of any of the codes programmed into the central processor 100 are read. During initialization of the scanner interface circuit 160 by the central processor 100, the scanner interface circuit 160 is programmed in accordance therewith. The central processor 100 then transmits the address code and feed command to the associated feeder module 76. As is apparent from the accompanying flow charts and microfiche appendix it should be understood that the feed command may include signals other than simply feed such as among others, feed more than one, number of documents fed, initialize and diagnostic mode. Feeder module 76 then feeds the required documents in accordance with the feeder program stored therein for that particular type of feeder module. When the scanner interface circuit 160 determines that the last document for that particular coalation package has been fed from feeder 76, the scanner interface circuit 160 transmits and end of collation signal to the feeder interface circuit 110 which ceases document feeding at that station. The documents fed from feeder 76 are then transported along the transport deck to the next feeder station 74, with this process being repeated from station to station so that a properly collated stack of documents arrives at the envelope feeder 48.

The transport encoder 198 provides pulses representing an increment of document travel along the document transport deck or path. The transport encoder 198 communicates these pulses to the central processor 100 which keeps track of the pulse count. The central processor 100 keeps track of the encoder count and issues a feed command to the appropriate feeder module when the appropriate count is reached. This count may be the same for all feeder modules or it may vary as desired.

Error conditions in the document feed are transmitted from the feeder interface circuit 110 for the particular feeder station to the central processor 100 for display on the central control display 34 describing to the operator the fault location and a description thereof in human readable form. After the document feeding at each feeder module is complete, the data representing the document is transmitted to the central processor 100 and stored in the RAM updating the data table representing that document. Details regarding the diagnostic mode can be obtained from the above patent application entitled "DIAGNOSTIC MODE FOR A MULTI-STATION DOCUMENT INSERTER".

The operator may change or reconfigure the supervisory control circuit 100 by activating certain switches of the central control display 34 so that the mirror image of the data table in the configuration PROM which is present in the RAM is changed. Details of the central control display and the ability of the operator to reconfigure the inserter is found in the above-noted pending application entitled "USER FRIENDLY CENTRAL CONTROL DISPLAY FOR A MULTI-STATION DOCUMENT INSERTER".

While this invention has been described in conjunction with a specific embodiments thereof, it is evident that many alternative modifications and variations will be apparent to those skilled the art. Accordingly, it is intended to embrace all such alternatives, modifications and variations that fall within the spirit and scope of the appended claims.

What is claimed is:

1. In a document inserter having a plurality of document feeder stations, a central processor for providing address and command signals to each of the feeder stations, the central processor having a supervisory program stored therein including a data table and a configuration PROM which include information on the type of feeder station and the functions to be performed thereby, a scanner means for detecting a predetermined code on a coded document, and a universal feeder interface circuit for each feeder station comprising:

address means for providing each feeder station with a unique address, distributed processor means associated respectively with each feeder station for storing feeder programs containing instructions for the feeder for feeding documents, means for interconnecting the distributed processor means with the central processor and the scanner, and each said feeder station thereby feeding documents in accordance with the predetermined code on said coded document when said central processor provides the unique address and command signals.

2. A universal feeder interface circuit as set forth in claim 1 and further including comparator means for comparing address data received from the central processor with the unique address provided by the address means to provide an acknowledge signal when there is a coincidence therebetween.

3. A universal interface feeder circuit as set forth in claim 1 wherein the address means for providing the unique address includes a user operated switch for predetermining the unique address.

4. A universal interface circuit as set forth in claim 1 wherein the feeder circuit includes means for receiving a signal from the central processor indicating that the scanner has actuated the presence of a coded document.

5. A universal feeder interface circuit as set forth in claim 1 wherein the feeder circuit includes means for receiving a coded signal from the central processor indicating an end of collation.

6. A universal feeder interface circuit as set forth in claim 1 including means for transmitting data to the data table in the central processor after each feeder station has completed its feed sequence to update the data table.

7. A method for operating a feeder station in a document inserter having a plurality of document feeder stations, a central processor for providing address and command signals to each of the feeder stations, the central processor having a supervisory program stored therein including a data table and a configuration PROM which include information on the type of feeder station and the functions to be performed thereby, and a scanner means for detecting a predetermined code on a coded document comprising the steps of:

providing each feeder station with a feeder interface circuit and a unique address, storing feeder programs containing instructions for the feeder for feeding documents in a distributed processor provided in the feeder circuit, interconnecting the distributed processors for communication through the feeder interface circuit with the central processor and the scanner, detecting the predetermined code on a coded document, and feeding documents in accordance with the detected code.

8. A method as set forth in claim 7 and further including comparing address data received from the central processor with the unique address provided by the address means to provide an acknowledge signal when there is a coincidence therebetween.

9. A method as set forth in claim 1 including transmitting data to the data table in the central processor after each feeder station has completed its feed sequence to update the data table.

* * * * *